(12) United States Patent
Ikegami et al.

(10) Patent No.: US 10,642,685 B2
(45) Date of Patent: May 5, 2020

(54) CACHE MEMORY AND PROCESSOR SYSTEM

(71) Applicant: Kioxia Corporation, Tokyo (JP)

(72) Inventors: Kazutaka Ikegami, Kanagawa (JP); Shinobu Fujita, Tokyo (JP); Hiroki Noguchi, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 103 days.

(21) Appl. No.: 15/262,218

(22) Filed: Sep. 12, 2016

(65) Prior Publication Data
US 2016/0378592 A1 Dec. 29, 2016

Related U.S. Application Data

(63) Continuation of application No. PCT/JP2015/058418, filed on Mar. 20, 2015.

(30) Foreign Application Priority Data

Mar. 20, 2014 (JP) .................................. 2014-058848

(51) Int. Cl.
*G06F 11/00* (2006.01)
*G06F 11/10* (2006.01)
(Continued)

(52) U.S. Cl.
CPC .......... *G06F 11/1064* (2013.01); *G06F 3/064* (2013.01); *G06F 3/068* (2013.01);
(Continued)

(58) Field of Classification Search
CPC .... G06F 11/1064; G06F 3/0619; G06F 3/064; G06F 3/068; G06F 12/0893;
(Continued)

(56) References Cited

U.S. PATENT DOCUMENTS 7,890,836 B2  2/2011  Eilert
8,724,403 B2  5/2014  Nomura et al.
(Continued)

FOREIGN PATENT DOCUMENTS

JP  2008-276646  11/2008
JP  2009-282752  12/2009
(Continued)

OTHER PUBLICATIONS

Clinton W. Smullen et al., "Relaxing Non-Volatility for Fast and Energy-Efficient STT-RAM Caches", 2011 IEEE 17th International Symposium on High Performance Computer Architecture (HPCA), Feb. 12, 2011, pp. 50-61.
(Continued)

*Primary Examiner* — Christine T. Tu
(74) *Attorney, Agent, or Firm* — Finnegan, Henderson, Farabow, Garrett & Dunner, L.L.P.

(57) ABSTRACT

A cache memory has cache memory circuitry comprising a nonvolatile memory cell to store at least a portion of a data which is stored or is to be stored in a lower-level memory than the cache memory circuitry, a first redundancy code storage comprising a nonvolatile memory cell capable of storing a redundancy code of the data stored in the cache memory circuitry, and a second redundancy code storage comprising a volatile memory cell capable of storing the redundancy code.

10 Claims, 20 Drawing Sheets

(51) Int. Cl.
    *G06F 12/16* (2006.01)
    *G06F 12/0893* (2016.01)
    *G06F 3/06* (2006.01)
    *G06F 12/0895* (2016.01)
    *G06F 12/0811* (2016.01)

(52) U.S. Cl.
    CPC ........ *G06F 3/0619* (2013.01); *G06F 12/0893* (2013.01); *G06F 12/0895* (2013.01); *G06F 12/16* (2013.01); *G06F 12/0811* (2013.01); *G06F 2212/1032* (2013.01); *G06F 2212/221* (2013.01); *G06F 2212/222* (2013.01); *G06F 2212/225* (2013.01); *G06F 2212/403* (2013.01); *G06F 2212/7207* (2013.01)

(58) Field of Classification Search
    CPC .. G06F 12/0895; G06F 12/16; G06F 12/0811; G06F 2212/1032; G06F 2212/221; G06F 2212/222; G06F 2212/225; G06F 2212/403; G06F 2212/7207
    See application file for complete search history.

(56) References Cited

U.S. PATENT DOCUMENTS

| | | | |
|---|---|---|---|
| 9,632,935 B2 * | 4/2017 | Cherian | ............... G06F 12/0833 |
| 9,696,922 B2 * | 7/2017 | Okada | ................... G06F 3/0619 |
| 2008/0276040 A1 | 11/2008 | Moritoki | |
| 2012/0233377 A1 * | 9/2012 | Nomura | ............... G06F 12/0893 711/3 |
| 2013/0139007 A1 | 5/2013 | Higo et al. | |

FOREIGN PATENT DOCUMENTS

| | | |
|---|---|---|
| JP | 2010-512601 | 4/2010 |
| JP | 2011-257966 | 12/2011 |
| JP | 2013-114441 | 6/2013 |
| JP | 2013-218403 | 10/2013 |

OTHER PUBLICATIONS

Kumiko Nomura et al., "Runtime Normally-Off Processor with Nonvolatile Cache Memory Based on High-Speed and Low-Power STT-MRAMs", Toshiba Review, Sep. 2012, vol. 67, No. 9, pp. 48-51.

International Search Report dated May 26, 2015 from the Japanese Patent Office in International Application No. PCT/JP2015/058418. 2 pages.

International Preliminary Report on Patentability dated Sep. 29, 2016, issued by The International Bureau of WIPO in International Application No. PCT/JP2015/058418: 2 pages.

Written Opinion dated May 26, 2015, issued by Japanese Patent Office in International Application No. PCT/JP2015/058418: 4 pages.

* cited by examiner

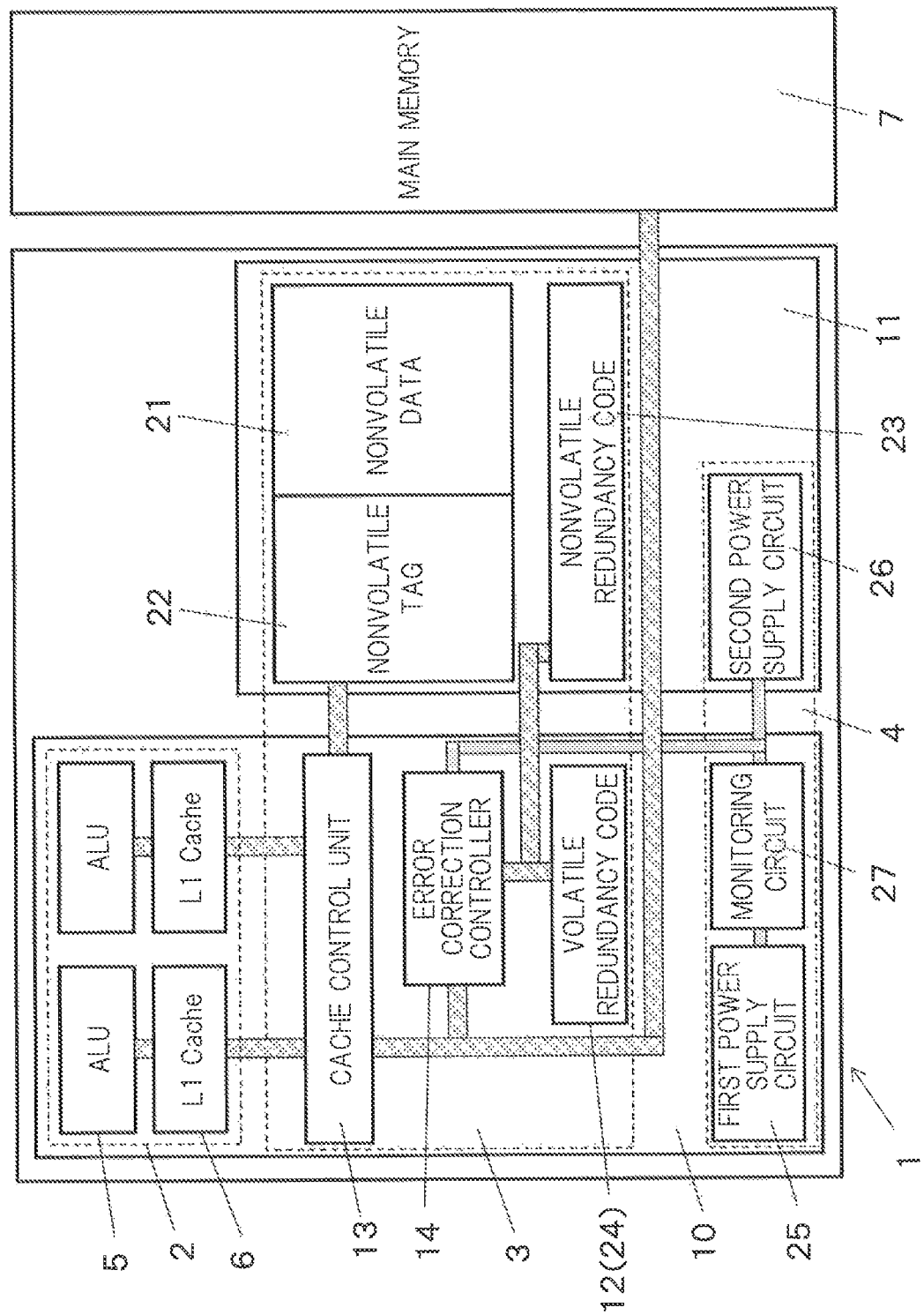
F I G. 1

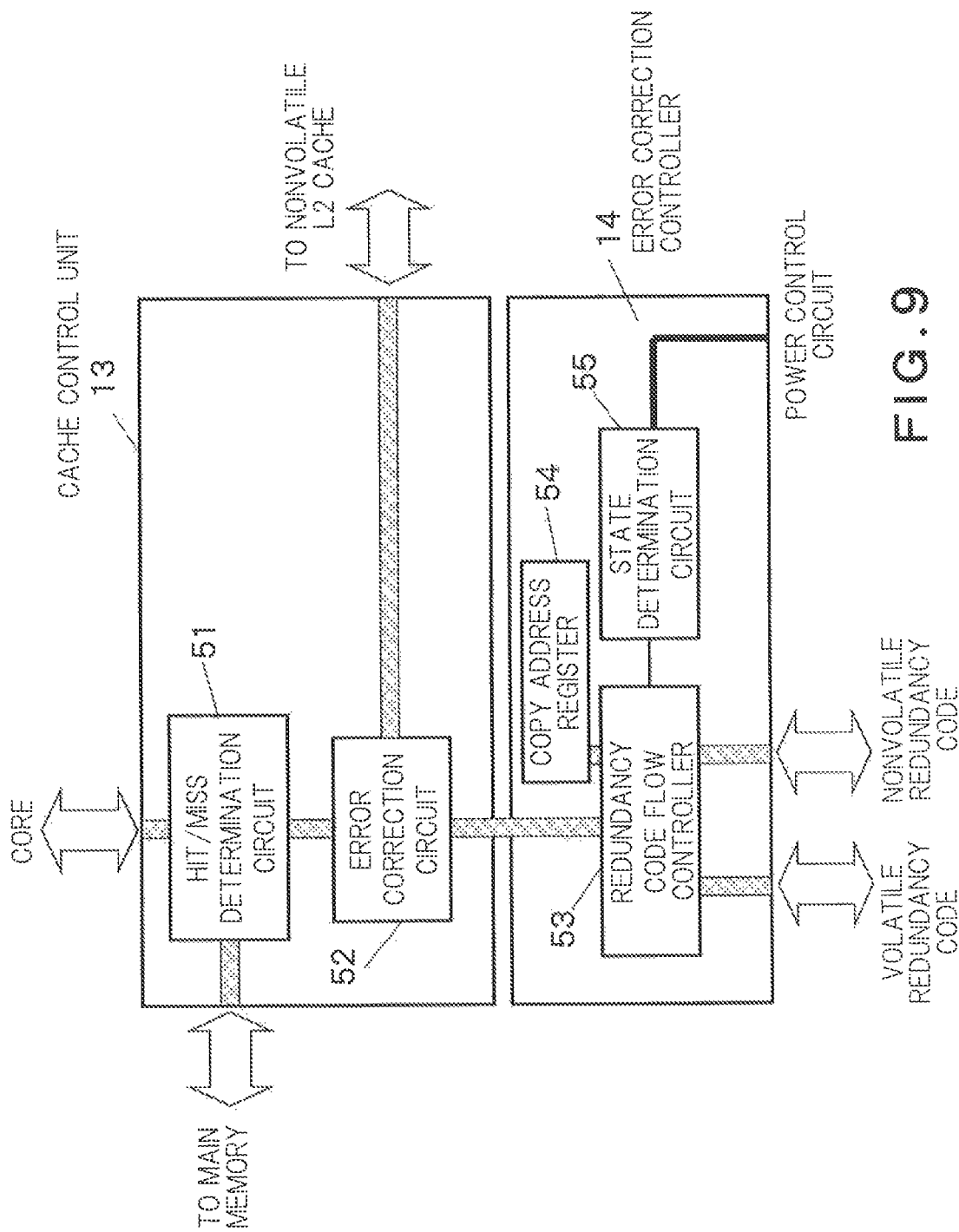
F I G. 9

NORMAL WRITE OPERATION

US 10,642,685 B2

CACHE MEMORY AND PROCESSOR SYSTEM

CROSS REFERENCE TO RELATED APPLICATIONS

This application is based upon and claims the benefit of priority from the prior Japanese Patent Application No. 2014-58848, filed on Mar. 20, 2014, the entire contents of which are incorporated herein by reference.

FIELD

Embodiments of the present invention relate to a cache memory having a nonvolatile memory and a processor system.

BACKGROUND

In the related art, a technique of improving data reliability of a cache memory by using an error correction code (ECC) is introduced. In general, in order to perform operations at a high speed, a redundancy code for error correction is shorter than data in terms of a code length. In addition, in writing in a memory circuit, in general, if the code length is long, delay is increased. Therefore, it is considered to adopt an operation sequence for performing calculation of the redundancy code and its writing in a parallel manner during the writing of data bits.

By adopting the operation sequence, the delay in the calculation of the redundancy code and its writing is concealed by the delay of the writing of the long data bits, so that a high-speed write operation can be realized.

Since the delay of the writing of a nonvolatile memory cell itself is considerably larger than the delay of other circuit blocks in the nonvolatile memory circuit, the time of writing in the nonvolatile memory circuit depends on the delay of the writing of the nonvolatile memory cell itself. Therefore, although the code length of the redundancy code is set to be shorter than the length of the data bits, the delay of the writing of the redundancy code is not significantly decreased. Accordingly, in the case where a nonvolatile memory cell is used as a cache memory, since it takes a long time to calculate the redundancy code and to write it, there is a problem in that a time of data access is increased.

BRIEF DESCRIPTION OF THE DRAWINGS

FIG. 1 is a block diagram illustrating a schematic configuration of a processor system 1 according to a first embodiment;

FIG. 9 is a block diagram illustrating an example of an internal configuration of a cache control unit 13 and an error correction controller 14;

DETAILED DESCRIPTION

Figure 2:
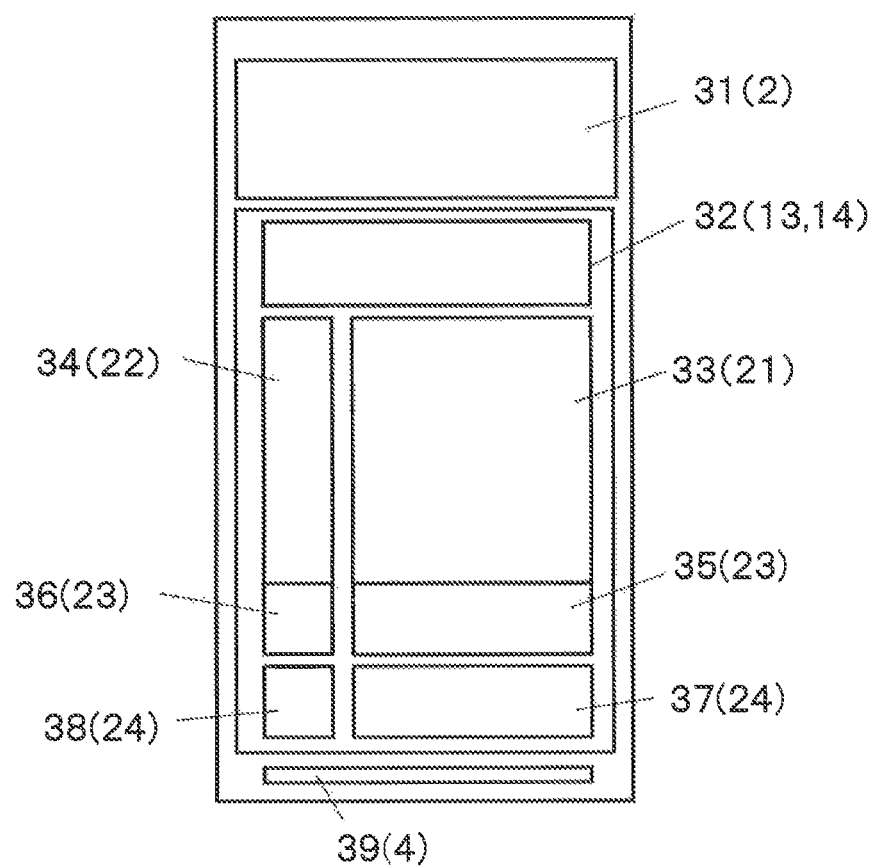
FIG. 2 is a functional block diagram illustrating the processor system 1 of FIG. 1.

According to one embodiment, a cache memory has cache memory circuitry comprising a nonvolatile memory cell to store at least a portion of a data which is stored or is to be stored in a lower-level memory than the cache memory circuitry, a first redundancy code storage comprising a nonvolatile memory cell capable of storing a redundancy code of the data stored in the cache memory circuitry, and a second redundancy code storage comprising a volatile memory cell capable of storing the redundancy code.

Hereinafter, embodiments of the invention will be described with reference to the drawings.

First Embodiment

FIG. 1 is a block diagram illustrating a schematic configuration of a processor system 1 according to a first embodiment. The processor system 1 of FIG. 1 includes a processor core 2, a cache memory 3, and a power supply control unit 4.

The processor core 2 has, for example, a multi-core configuration including a plurality of arithmetic logical units (ALUs) 5 and a plurality of L1 caches 6. Since a high speed is required, the L1 cache 6 is configured with, for example, a static random access memory (SRAM). In addition, the processor core 2 may have a single-core configuration.

The cache memory 3 of FIG. 1 stores at least a portion of data which are stored in a main memory (lower-level memory) 7 or data which are to be stored therein and includes high-order cache memories subsequent to L2 caches. The cache memory 3 of FIG. 1 includes a nonvolatile memory unit 11, a volatile memory unit 12, a cache control unit 13, and an error correction controller 14.

The nonvolatile memory unit 11 is configured by using nonvolatile memory cells and is used as the aforementioned high-order cache memory 3. The high-order cache memory 3 is not required to have such a high speed as an SRAM but is required to have a high speed capable of being used as the cache memory 3. More specifically, for example, as the nonvolatile memory cell, a magnetoresistive RAM (MRAM) cell is used.

The nonvolatile memory unit 11 includes a cache data unit (cache memory circuitry) 21, a tag unit 22, a nonvolatile redundancy code storage unit (first redundancy code storage unit) 23. The cache data unit 21 stores data which are stored in the main memory 7 or data which are to be stored therein. The cache data unit 21 stores the data in unit of a cache line. The cache line corresponds to, for example, 512 bits. The tag unit 22 stores address information corresponding to the data which are stored in the cache data unit 21. The nonvolatile redundancy code storage unit 23 stores a redundancy code of the data stored in the cache data unit 21 (data redundancy code) and a redundancy code of the data stored in the tag unit 22 (tag redundancy code).

The volatile memory unit 12 is configured by using a volatile memory which can be accessed at a high speed such as a register circuit or an SRAM. In this specification, it is assumed that the access speed of the volatile memory unit 12 is higher than that of the nonvolatile memory unit 11. The volatile memory unit 12 includes a volatile redundancy code storage unit (second redundancy code storage unit) 24. The volatile redundancy code storage unit 24 stores the redundancy code of the data stored in the cache data unit 21 (data redundancy code) and the redundancy code of the data stored in the tag unit 22 (tag redundancy code).

The cache control unit 13 determines whether or not data corresponding to an address issued by the processor core 2 are stored in the cache data unit 21.

The error correction controller 14 determines which one of the nonvolatile redundancy code storage unit 23 and the volatile redundancy code storage unit 24 stores a redundancy code for error correction of the data stored in the cache memory 3, and performs control of storing the redundancy code in the determined storage unit and reading the stored redundancy code.

The power supply control unit 4 includes a second power supply circuit 26 for the nonvolatile memory unit 11, a first power supply circuit 25 for the CMOS circuit, and a monitoring circuit 27. The second power supply circuit 26 supplies a power voltage to the nonvolatile memory unit 11 based on a signal from the monitoring circuit 27. The first power supply circuit supplies a power voltage to circuit blocks except for the nonvolatile memory unit 11 in the processor system 1 of FIG. 1 based on a signal from the monitoring circuit 27.

The monitoring circuit 27 monitors whether or not there is a processing request from an outside to the processor core 2 and a processing state in the processor system 1. In the case where the process of the processor core 2 is stopped for a certain time and there is no processing request from an outside, the monitoring circuit 27 decreases the power voltage of at least a portion of the circuit blocks in the processor system 1 or supplies a power supply control signal for stopping supply of the power voltage to each power supply circuit. The power supply control signal is also transmitted to the error correction controller 14. The error correction controller 14 controls reading and writing of the redundancy code with respect to the nonvolatile redundancy code storage unit 23 and the volatile redundancy code storage unit 24 based on the power supply control signal.

In FIG. 1, the processor core 2, the cache control unit 13, the error correction controller 14, the volatile memory unit 12, the first power supply circuit 25, and the monitoring circuit 27 are a CMOS unit 10 having a plurality of CMOS transistors.

FIG. 2 is a functional block diagram illustrating the processor system 1 of FIG. 1. In a first block 31 of FIG. 2, the processor core 2 and the L1 cache 6 are arranged. In a second block 32, the cache control unit 13 and the error correction controller 14 are arranged. In a third block 33, the cache data unit 21 in the nonvolatile memory unit 11 is arranged. In a fourth block 34, the tag unit 22 in the nonvolatile memory unit 11 is arranged. In a fifth block 35, a portion (storage area for the data redundancy code) of the nonvolatile redundancy code storage unit 23 in the nonvolatile memory unit 11 is arranged. In a sixth block 36, a portion (storage area for the tag redundancy code) of the nonvolatile redundancy code storage unit 23 in the nonvolatile memory unit 11 is arranged. In a seventh block 37, a portion (storage area for the data redundancy code) of the volatile redundancy code storage unit 24 in the volatile memory unit 12 is arranged. In an eighth block 38, a portion (storage area for the tag redundancy code) of the volatile redundancy code storage unit 24 in the volatile memory unit 12 is arranged. In a ninth block 39, the power supply control unit 4 is arranged.

Figure 3:
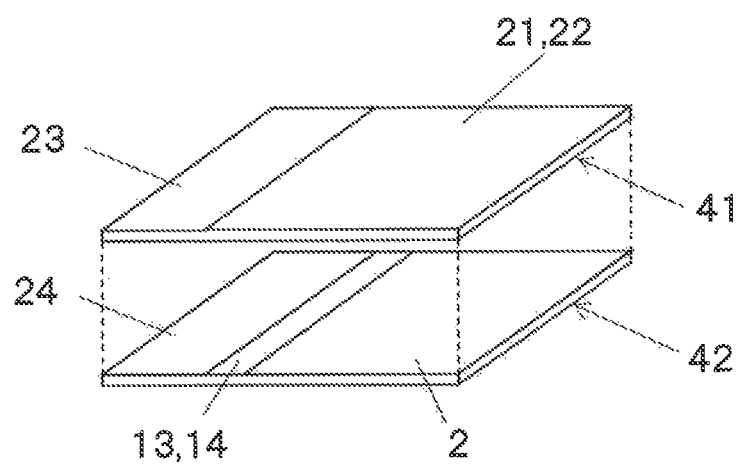
FIG. 3 is a diagram illustrating an example of a processor system mounted by using a three-dimensional stacking technique.

The processor system 1 of FIG. 1 may be formed in a multi-chip configuration where, for example, as illustrated in FIG. 3, a nonvolatile memory chip 41 and a CMOS chip 42 are stacked by using a three-dimensional stacking technique. In the nonvolatile memory chip 41, the nonvolatile memory unit 11 of FIG. 1 is mounted. In the CMOS chip 42, all the circuit blocks excluding the nonvolatile memory unit 11 in the processor system 1 of FIG. 1 are mounted.

Figure 4:
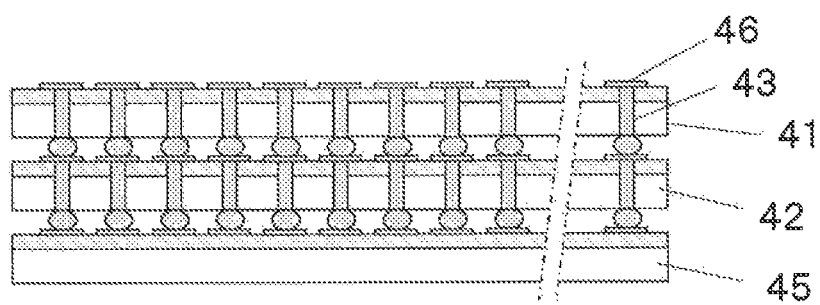
FIG. 4 is a diagram illustrating a stacking technique using TSV.
Figure 5:
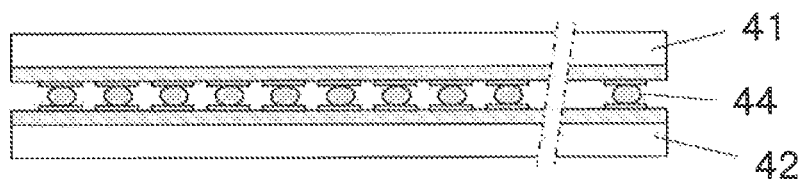
FIG. 5 is a diagram illustrating a stacking technique using micro bumps.

As an applicable three-dimensional stacking technique, there are a stacking technique using through silicon vias (TSVs) 43 illustrated in FIG. 4, a stacking technique using micro bumps 44 illustrated in FIG. 5, and the like. In the case of FIG. 4, for example, the CMOS chip 42 is stacked on a silicon substrate 45, and the nonvolatile memory chip 41 is stacked thereon. Pads 46 on one chip are electrically connected to the respective pads on the other chip through the respective TSVs 43. In the case of FIG. 5, pads on the CMOS chip 42 are attached to the respective pads of the nonvolatile memory chip 41 by using micro bump 44.

In any one of FIGS. 3 to 5, the order of stacking the nonvolatile memory chip 41 and the CMOS chip 42 is not particularly limited.

As described above, the monitoring circuit 27 controls the power voltage supplied to each circuit block in the processor system 1 according to the operating state of the processor core 2.

Figure 6:
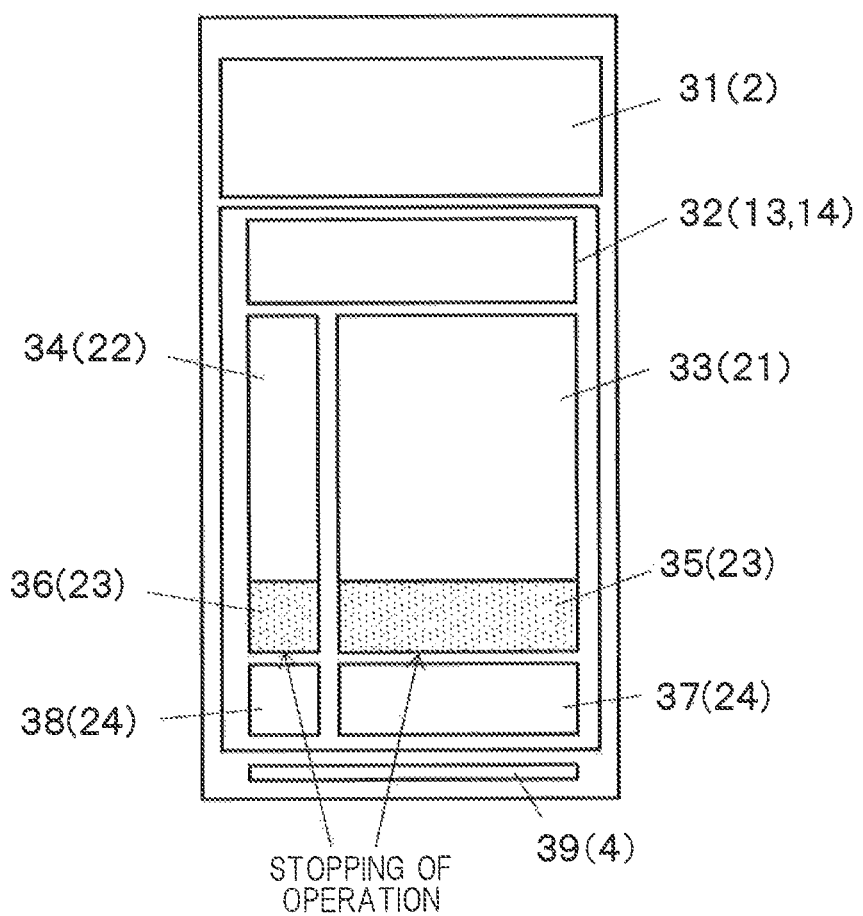
FIG. 6 is a diagram illustrating a state of power supply to each circuit block in the processor system 1 in a normal operation period of a processor core 2.

FIG. 6 is a diagram illustrating a state of power supply to each circuit block in the processor system 1 in the normal operation period of the processor core 2. As illustrated in FIG. 6, in the normal operation period of the processor core 2, the fifth block 35 and the sixth block 36 indicated in gray are supplied with no power voltage, and all the blocks excluding the aforementioned blocks are supplied with the power voltage. This means that, in the normal operation period of the processor core 2, the nonvolatile redundancy code storage unit 23 of the nonvolatile memory unit 11 is not used. Namely, in the normal operation period of the processor core 2, the data redundancy code and the tag redundancy code are stored in the volatile redundancy code storage unit 24 of the volatile memory unit 12.

In addition, the normal operation period of the processor core 2 denotes a time period when the processor core 2 performs a process operation.

Figure 7:
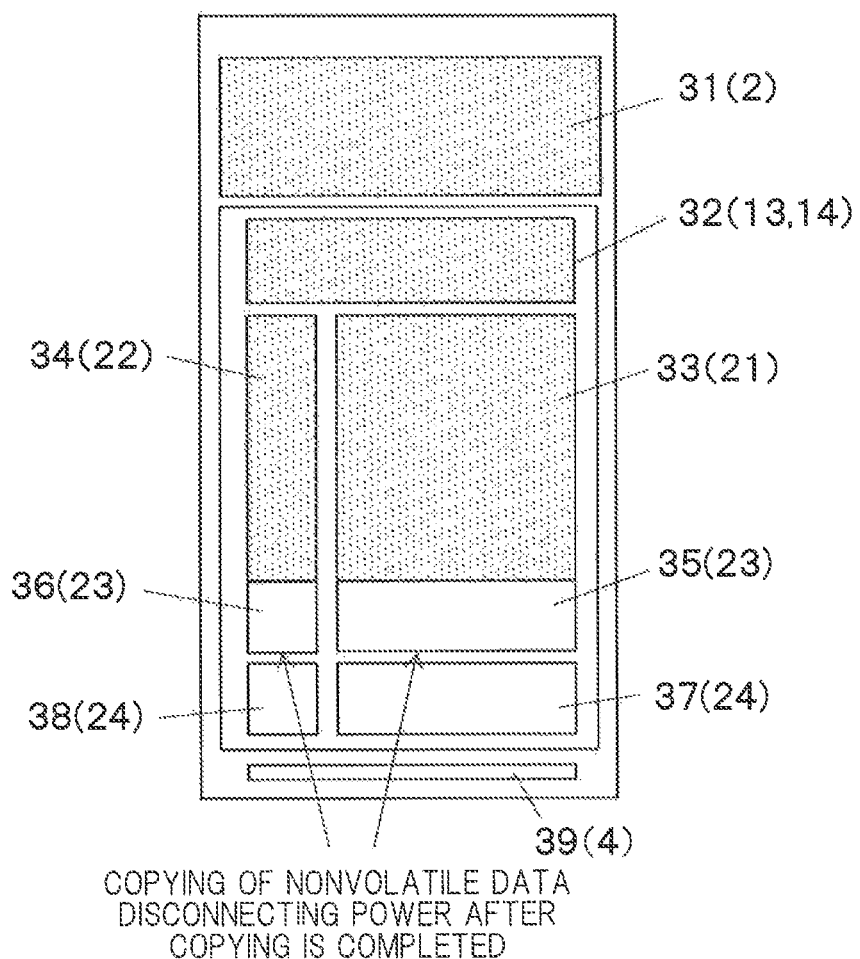
FIG. 7 is a diagram illustrating a state of power supply to each circuit block in the processor system 1 in a power disconnection period.

FIG. 7 is a diagram illustrating a state of power supply to each circuit block in the processor system 1 in a power disconnection period. In the power disconnection period, the monitoring circuit 27 disconnects supply of the power voltage to the first to fourth blocks 31 to 34. Namely, the processor core 2, the cache control unit 13, the error correction controller 14, and the cache data unit 21 and the tag unit 22 of the nonvolatile memory unit 11 are supplied with no power voltage. In addition, in the power disconnection period, the data redundancy code and the tag redundancy code stored in the volatile redundancy code storage unit 24 of the volatile memory unit 12 are copied to the nonvolatile redundancy code storage unit 23 of the nonvolatile memory unit 11. Next, after the copying is completed, the monitoring circuit 27 disconnects the power supply to the volatile memory unit 12 and the nonvolatile memory unit 11. Namely, the monitoring circuit 27 disconnects the power supply to the fifth to eighth blocks 35 to 38. As a result, in the state in the power disconnection period, only the monitoring circuit 27 in the power supply control unit 4 is operating. In addition, although the power voltage to the nonvolatile memory unit 11 is disconnected, the data in the nonvolatile memory unit 11 are not lost. Therefore, the data redundancy code and the tag redundancy code copied to the nonvolatile memory unit 11 can be re-used after the power is restored.

Figure 8:
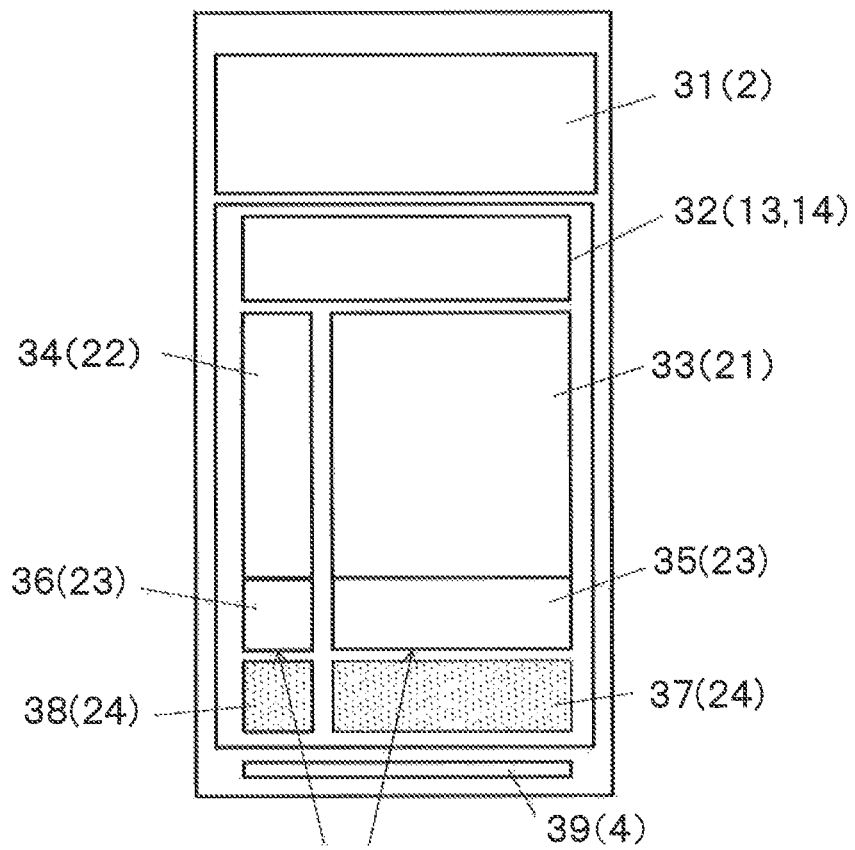
FIG. 8 is a diagram illustrating a state of power supply to each circuit block in the processor system 1 immediately after power restoration.

FIG. 8 is a diagram illustrating a state of power supply to each circuit block in the processor system 1 immediately after power restoration. Immediately after power restoration, any valid data are not stored in the volatile memory unit 12. Therefore, the data redundancy code and the tag redundancy code stored in the nonvolatile redundancy code storage unit 23 of the nonvolatile memory unit 11 are copied to the volatile redundancy code storage unit 24 of the volatile memory unit 12. Accordingly, at the timing faster than the timing when the error correction controller 14 rewrites the redundancy codes in the volatile redundancy code storage unit 24, the processor core 2 can restart the processing. If the copying is completed, the procedure returns to the normal operation illustrated in FIG. 6.

FIG. 9 is a block diagram illustrating an example of an internal configuration of the cache control unit 13 and the error correction controller 14. The cache control unit 13 of FIG. 9 includes a hit/miss determination circuit 51 and an error correction circuit 52. The hit/miss determination circuit 51 determines by referring to the tag unit 22 whether or not a data to which there is an access request from the processor core 2 is stored in the cache data unit 21. The error correction circuit 52 performs error correction of the data read from the cache data unit 21 according to the access request from the processor core 2. The error-corrected data is transmitted to the processor core 2. In addition, the error correction circuit 52 generates a data redundancy code and a tag redundancy code from a data and an address to which there is a write request from the processor core 2.

The error correction controller 14 of FIG. 9 includes a redundancy code flow controller 53, a copy address register 54, and a state determination circuit 55. The redundancy code flow controller 53 performs control of storing the data redundancy code and the tag redundancy code in the nonvolatile redundancy code storage unit 23 of the nonvolatile memory unit 11 and the volatile redundancy code storage unit 24 of the volatile memory unit 12.

The copy address register 54 stores the corresponding addresses of the copied data in the copy address register 54 so that the processor core 2 can access the cache memory 3 during the copying of the data redundancy code and the tag redundancy code from the nonvolatile memory unit 11 to the volatile memory unit 12 immediately after power restoration.

Accordingly, even while copying the data redundancy code and the tag redundancy code from the nonvolatile memory unit 11 to the volatile memory unit 12 is being performed immediately after power restoration, the processor core 2 can access the cache memory 3. More specifically, immediately after power restoration, since the copying of the data redundancy code and the tag redundancy code from the nonvolatile memory unit 11 to the volatile memory unit 12 has not yet been completed, the redundancy codes are read from the nonvolatile memory unit 11. After the reading is completed, the copying is restarted from the address next to the address stored in the copy address register 54. Therefore, even before the copying is completed, the reading of the data redundancy code and the tag redundancy code is normally performed.

The state determination circuit 55 determines whether to be in the normal operation period of the processor core 2 or immediately after power restoration. The state determination circuit 55 can be configured with, for example, registers. The state determination circuit 55 determines, by referring to, for example, the copy address register 54 that the period is immediately after power restoration if the stored address is an intermediate address, and determines that the period is the normal operation period if the address is the last address.

Figure 10:
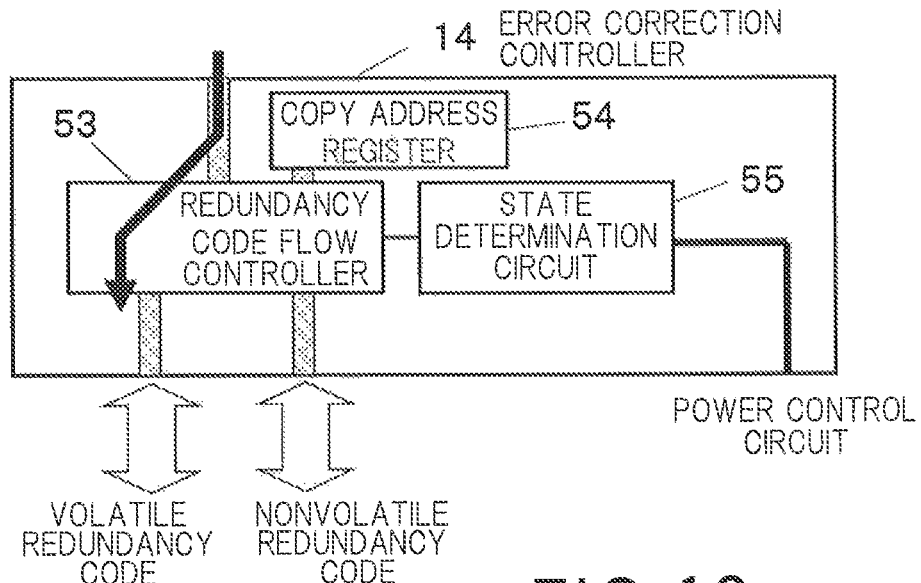
FIG. 10 is a diagram illustrating operations of a redundancy code flow controller 53 in the case where the processor core 2 performs a normal write operation.

FIG. 10 is a diagram illustrating an operation of the redundancy code flow controller 53 in the case where the processor core 2 performs a normal write operation. While the processor core 2 performs the normal write operation, the data redundancy code and the tag redundancy code generated by the error correction circuit 52 are stored in the volatile redundancy code storage unit 24 of the volatile memory unit 12 through the redundancy code flow controller 53. In this case, the data redundancy code and the tag redundancy code are not stored in the nonvolatile redundancy code storage unit 23 of the nonvolatile memory unit 11.

Figure 11:
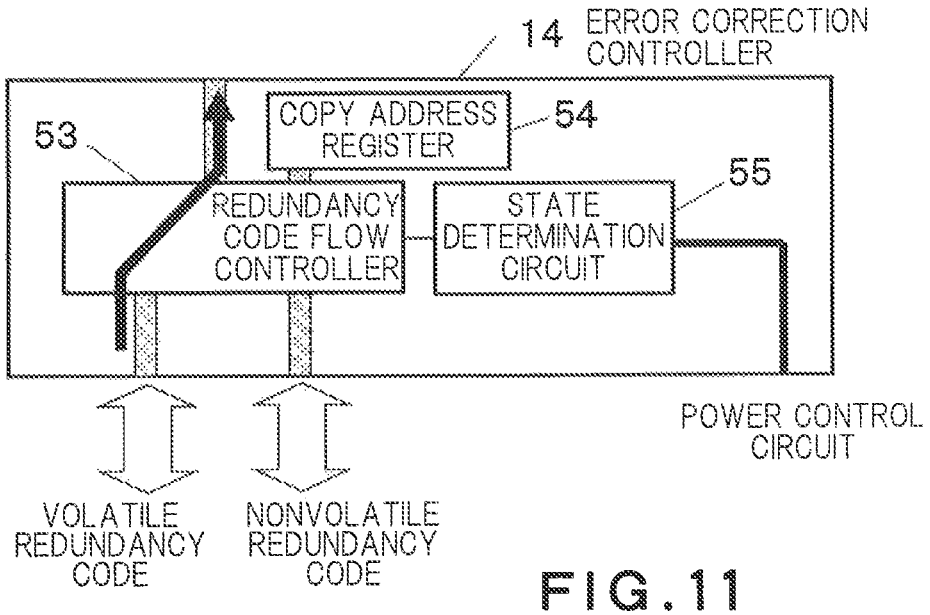
FIG. 11 is a diagram illustrating operations of the redundancy code flow controller 53 in the case where the processor core 2 performs a normal read operation.

FIG. 11 is a diagram illustrating an operation of the redundancy code flow controller 53 in the case where the processor core 2 performs a normal read operation. In this case, the data redundancy code and the tag redundancy code read from the volatile redundancy code storage unit 24 of the volatile memory unit 12 are transmitted to the processor core 2 through the redundancy code flow controller 53.

Figure 12:
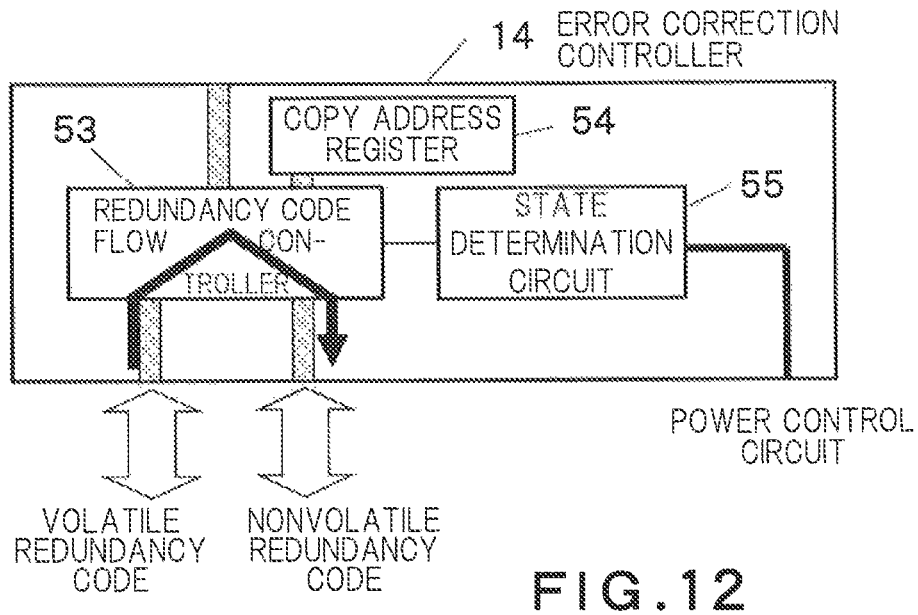
FIG. 12 is a diagram illustrating operations of the redundancy code flow controller 53 in a power disconnection period.

FIG. 12 is a diagram illustrating an operation of the redundancy code flow controller 53 in the power disconnection period. In order to disconnect the power supply, first, the data redundancy code and the tag redundancy code stored in the volatile redundancy code storage unit 24 of the volatile memory unit 12 are copied to the nonvolatile redundancy code storage unit 23 of the nonvolatile memory unit 11. If the copying is completed, the monitoring circuit 27 disconnects the power supply to the volatile memory unit 12 and the nonvolatile memory unit 11.

Figure 13:
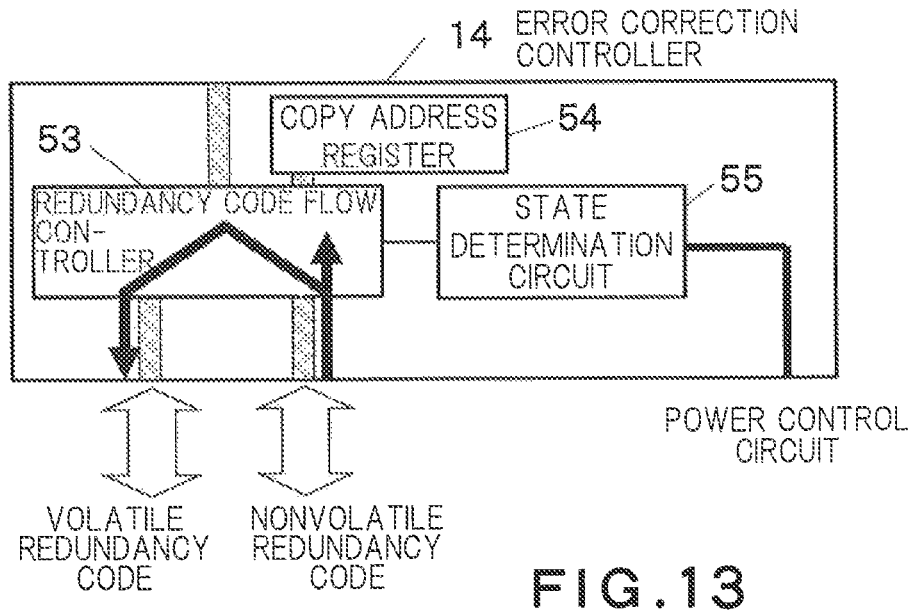
FIG. 13 is a diagram illustrating operations of the redundancy code flow controller 53 immediately after power restoration.

FIG. 13 is a diagram illustrating operations of the redundancy code flow controller 53 immediately after power restoration. Immediately after power restoration, the data redundancy code and the tag redundancy code stored in the nonvolatile redundancy code storage unit 23 of the nonvolatile memory unit 11 are copied to the volatile redundancy code storage unit 24 of the volatile memory unit 12. In addition, in order to prepare the case where there is a read request or a write request from the processor core 2 while the copying is being performed, the addresses corresponding to the data redundancy code and the tag redundancy code stored in the nonvolatile redundancy code storage unit 23 are stored in the copy address register 54.

Figure 14:
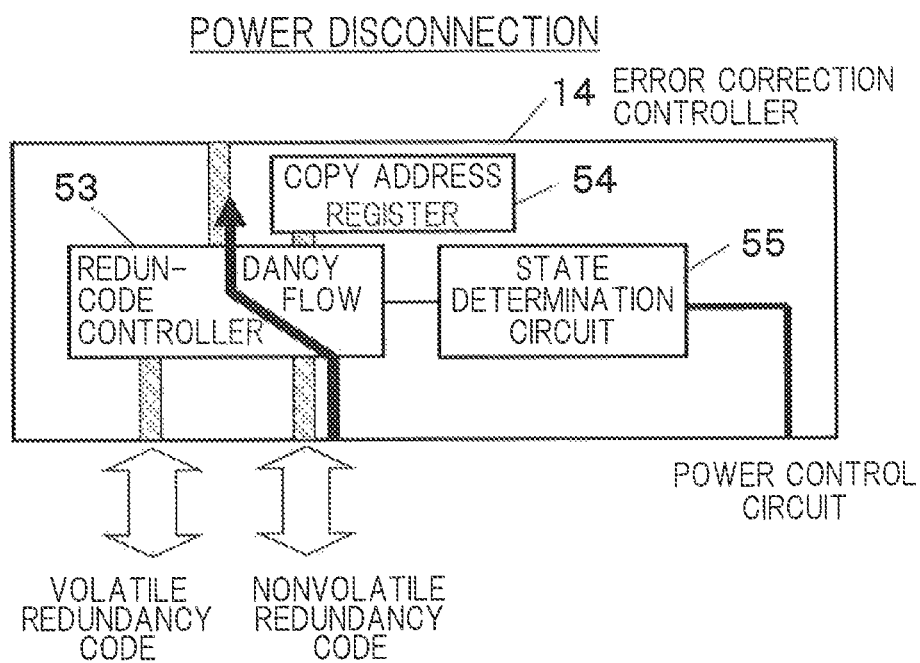
FIG. 14 is a diagram illustrating operations of the redundancy code flow controller 53 in the case where there is a read request from the processor core 2 immediately after power restoration.

FIG. 14 is a diagram illustrating operations of the redundancy code flow controller 53 in the case where there is a read request from the processor core 2 immediately after power restoration. Immediately after power restoration, the data is copied from the nonvolatile redundancy code storage unit 23 to the volatile redundancy code storage unit 24, but before the copying is completed, the data redundancy code and the tag redundancy code stored in the nonvolatile redundancy code storage unit 23 are transmitted to the processor core 2 through the redundancy code flow controller 53.

In the case where the power is restored and there is a write request from the processor core 2 during the copying of each redundancy code from the nonvolatile redundancy code storage unit 23 to the volatile redundancy code storage unit 24, there is a possibility that, while the copying has not yet been completed, the most recent redundancy code is stored in the volatile redundancy code storage unit 24. In this case, since the old redundancy code which is to be copied is stored in the nonvolatile redundancy code storage unit 23, if the process goes on as it is, there is a problem in that the most recent redundancy code in the volatile redundancy code storage unit 24 is overwritten with the old redundancy code in the nonvolatile redundancy code storage unit 23.

Figure 15:
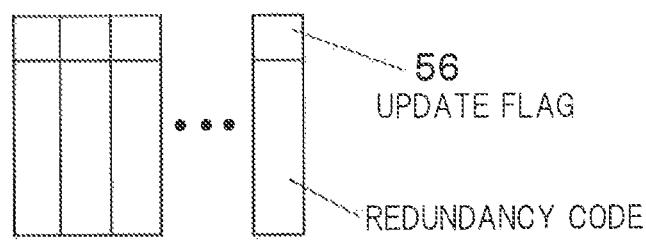
FIG. 15 is a diagram illustrating an update flag.

Therefore, as illustrated in FIG. 15, it is preferable that an update flag 56 is prepared for each redundancy code stored in the volatile redundancy code storage unit 24 so that it can be identified by the update flag 56 whether or not each redundancy code stored in the volatile redundancy code storage unit 24 is the most recent value. For example, in the power disconnection period, all the update flags 56 are set to 0. In the case where the writing of a new redundancy code is performed after the power restoration, the corresponding update flag 56 is set to 1. In addition, in the case where the copying of the redundancy code from the nonvolatile redundancy code storage unit 23 to the volatile redundancy code storage unit 24 is to be performed, only if the update flag 56 is 0, the copying is performed. Therefore, it is possible to prevent the problem of overwriting the new redundancy code with the old redundancy code by the copying. Since the update flag 56 may be 1-bit information, although the update flag is prepared in the volatile redundancy code storage unit 24, the capacity of the memory is not increased.

Next, operations of the monitoring circuit 27 will be described. The monitoring circuit 27 monitors the state of the operation of the processor core 2 and allows the circuit blocks of the processor system 1 to proceed to a low power consumption mode step by step as a time elapses from the stop of the operation of the processor core 2. Herein, the low power consumption mode is a mode of, for example, decreasing the power voltage or stopping the power supply to a portion of the circuit blocks in the processor system 1.

The low power consumption mode of the processor core 2 is generally referred to as a C state. A C0 state is a state where the processor core 2 performs the normal operation, and in the state, the power consumption is highest. As the state is transitioned to C1, C2, . . . , the process proceeds to a lower power consumption mode.

Figure 16:
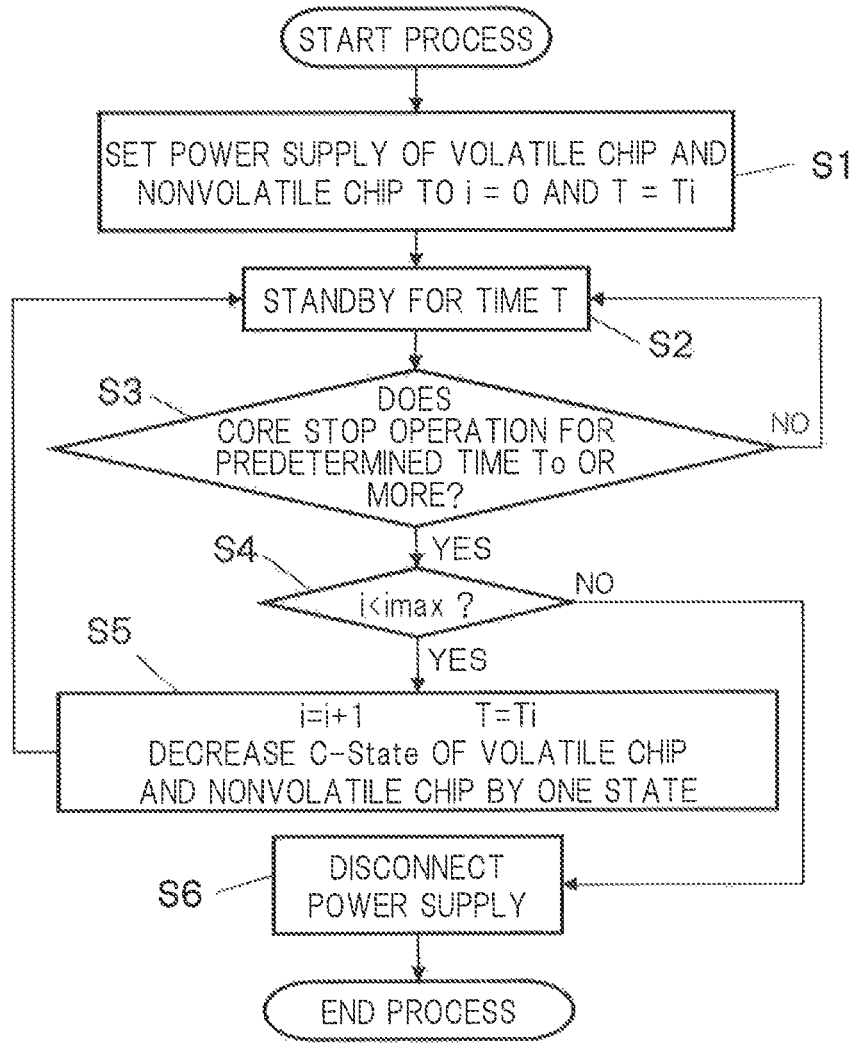
FIG. 16 is a flowchart illustrating an example of process operations of a monitoring circuit 27.

FIG. 16 is a flowchart illustrating an example of a process operation of the monitoring circuit 27. The power voltage is supplied to the nonvolatile memory chip 41 and the CMOS chip 42 corresponding to the processor system 1 illustrated in FIG. 3, a variable I and a time T is reset by i=0 and T=Ti (step S1). The variable i is a variable representing the C state. At the initial time, since the variable i is i=0, the processor system 1 operates in the C0 state. The time T is a duration when the processor core 2 stops the operation.

Next, it is determined whether or not the processor core 2 stops the operation for a predetermined time T=To or the more (steps S2 and S3). Until it is determined in step S3 that T≥To, the processes of steps S2 and S3 are repeated.

In the case where the processor core 2 stops the operation for the determined time To or more, it is determined whether or not the variable i is I<imax (step S4). If the variable i is i<imax, the variable i is incremented by 1, and the time T is reset by T=Ti. Therefore, the C state can be changed to a 1-level-lower power consumption mode, so that the processes after step S2 are repeated (step S5).

If it is determined in step S4 that the variable i is i≥imax, the power supply of the processor system 1 is disconnected (step S6). In step S6, the power supply to all the circuit blocks excluding the monitoring circuit 27 is disconnected.

Figure 17:
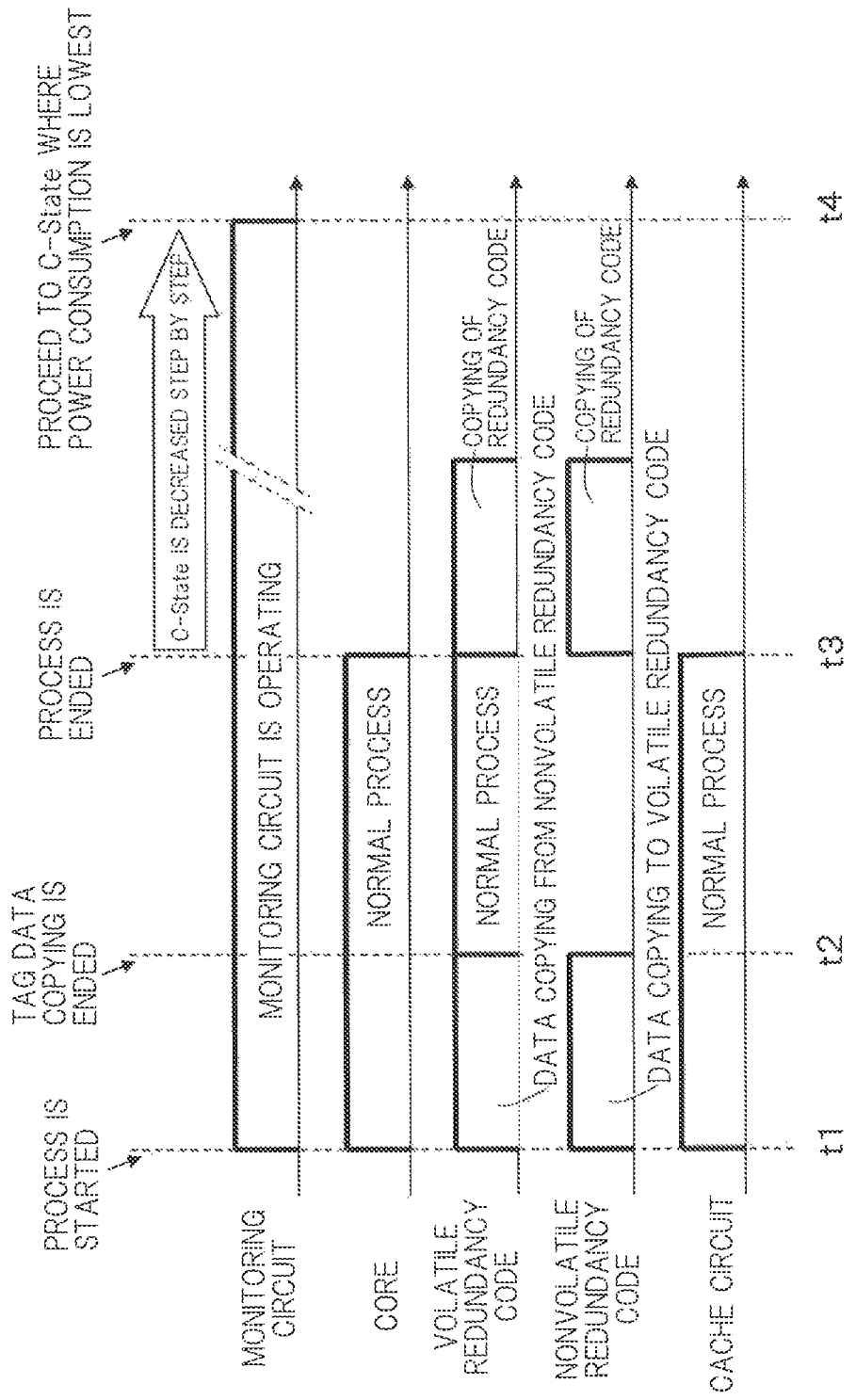
FIG. 17 is a timing diagram of the monitoring circuit 27.

FIG. 17 is a timing diagram of the monitoring circuit 27. This timing diagram illustrates timing from the time immediately after power restoration to the time after the processor core 2 stops the operation. If the power voltage is supplied to the processor system 1 at a time t1, the data redundancy code and the tag redundancy code stored in the nonvolatile redundancy code storage unit 23 of the nonvolatile memory unit 11 are copied to the volatile redundancy code storage unit 24 of the volatile memory unit 12 (time t1 to time t2).

If the copying of each redundancy code is completed at the time t2, in order to perform the access request for the cache memory 3, the processor core 2 accesses not the nonvolatile redundancy code storage unit 23 of the nonvolatile memory unit 11 but the volatile redundancy code storage unit 24 of the volatile memory unit 12. Therefore, the access can be performed at a higher speed than the access to the nonvolatile redundancy code storage unit 23.

If the processor core 2 stops the operation at a time t3, the redundancy code flow controller 53 copies the data redundancy code and the tag redundancy code stored in the volatile redundancy code storage unit 24 to the nonvolatile redundancy code storage unit 23 (time t3 to time t4). Next, after the copying is completed, the monitoring circuit 27 disconnects the power supply to the volatile memory unit 12 and the nonvolatile memory unit 11.

In addition, the monitoring circuit 27 monitors the elapsed time from the time of stopping the operation and performs low power consumption operations by changing the C state step by step according to the elapsed time. Finally, the state proceeds to the state where only the monitoring circuit 27 in the processor system 1 operates (time t4).

Figure 18:
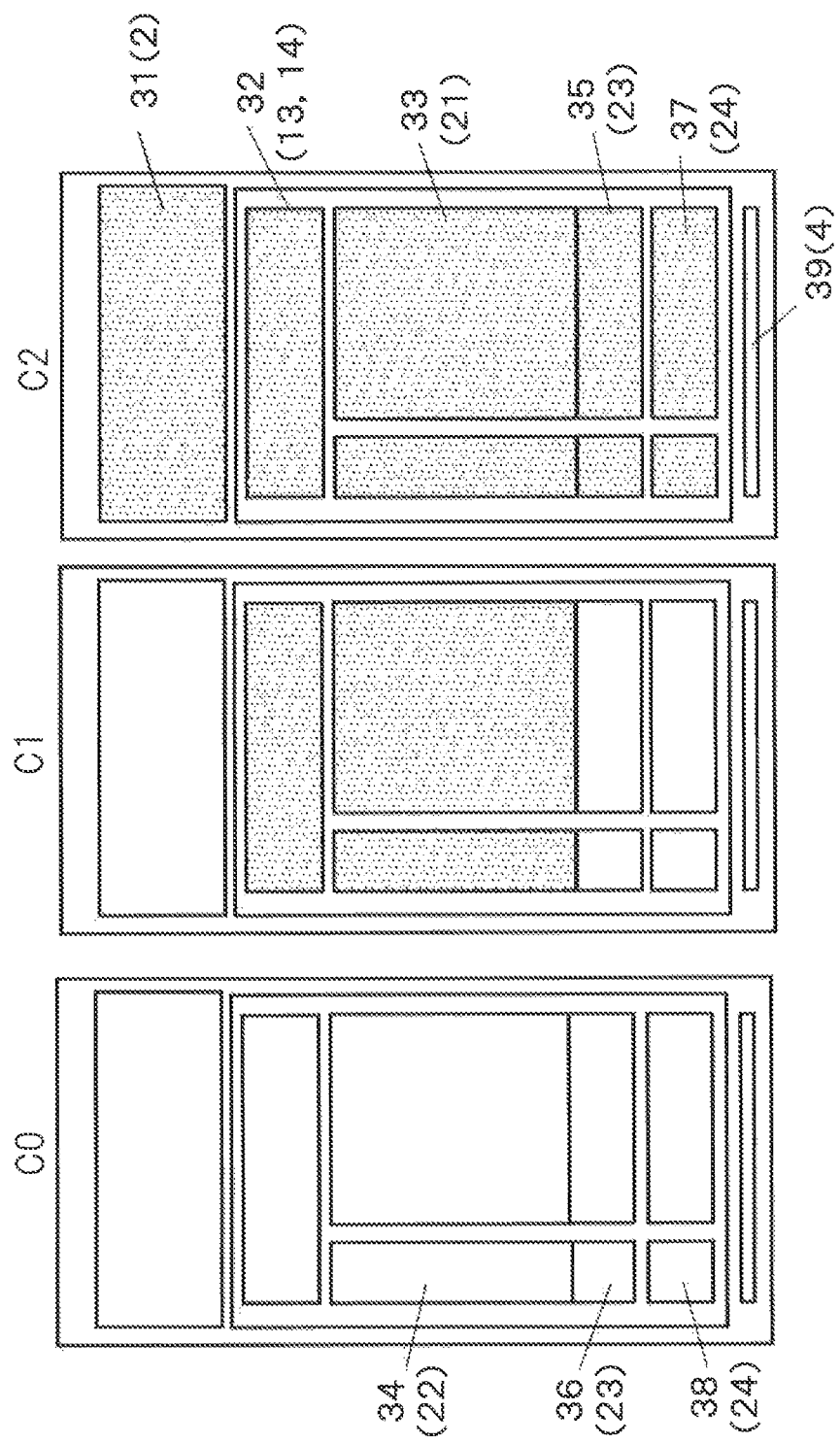
FIG. 18 is a diagram illustrating a first example of a C state.

FIG. 18 is a diagram illustrating a first example of the C state. In the example of FIG. 18, the C state is changed to C0, C1, and C2 states step by step. In the C0 state, the power voltage is supplied to all the circuit blocks in the processor system 1.

In the C1 state, the power supply to the second block 32 corresponding to the cache control unit 13 and the error correction controller 14 and the third and fourth blocks 33 and 34 corresponding to the cache data unit 21 and the tag unit 22 in the nonvolatile memory unit 11 is disconnected. However, in the C1 state, the power voltage is supplied to the nonvolatile redundancy code storage unit 23 of the nonvolatile memory unit 11 and the volatile redundancy code storage unit 24 of the volatile memory unit 12. This is because each redundancy code needs to be copied from volatile redundancy code storage unit 24 to the nonvolatile redundancy code storage unit 23.

In the C2 state, the power supply to the first to eighth blocks 31 to 38 except for the ninth block 39 including the monitoring circuit 27 is disconnected. Therefore, it is possible to suppress the power consumed in the processor system 1 to a minimum.

Figure 19:
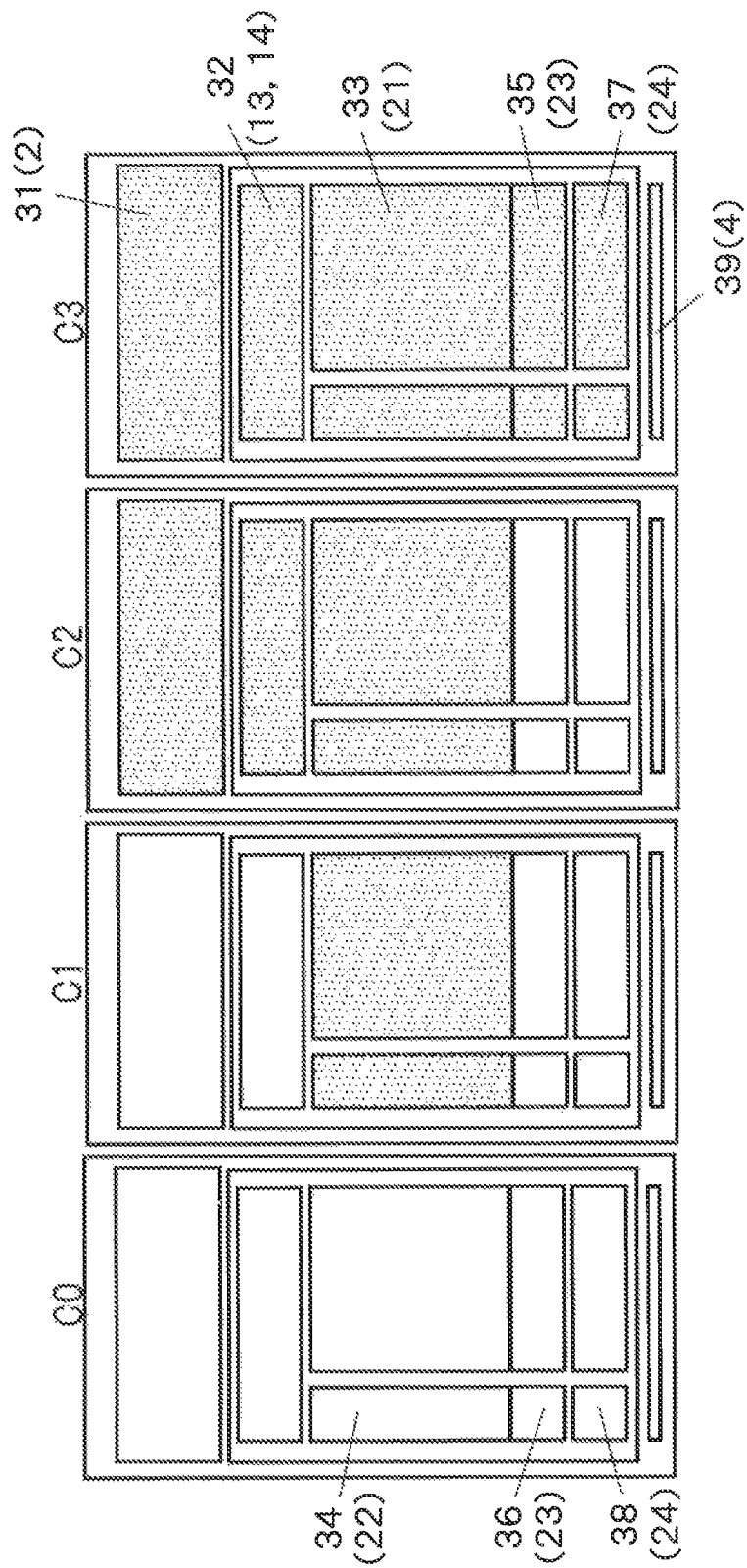
FIG. 19 is a diagram illustrating a second example of the C state.

The C state can also be transitioned more finely than FIG. 18. For example, FIG. 19 is a diagram illustrating a second example of the C state. In the example, the C state is changed to four states, that is, C0 to C3 states sequentially. The C0 and C3 states of FIG. 19 are the same as the C0 and C2 states of FIG. 18, respectively.

In the C1 state of FIG. 19, the power supply to the third and fourth blocks 33 and 34 corresponding to the cache data unit 21 and the tag unit 22 in the nonvolatile memory unit 11 is disconnected. However, the power voltage is supplied to the second block 32 corresponding to the cache control unit 13 and the error correction controller 14.

In addition, in the C2 state of FIG. 19, besides the third block 33 and the fourth block 34, the power supply to the first block 31 corresponding to the processor core 2 and the second block 32 corresponding to the cache control unit 13 and the error correction controller 14 is disconnected.

If the power-supply disconnected area is small, it is possible to speedily return to the one-step preceding state. In the case of FIG. 19, the number of states is increased by 1 from the number of states in FIG. 18, and thus, the power-supply disconnected area is increased slightly. Therefore, it is possible to speedily return to the C0 state. In addition, since the power-voltage supplied area in the C1 state of FIG. 19 is larger than the power-voltage supplied area in the C1 state of FIG. 18, the power consumption in the C1 state of FIG. 19 is larger than the power consumption in the C1 state of FIG. 18. Therefore, it is preferable that the state transition is designed so that the mode does not remain in the C1 state of FIG. 19 for a long time. In addition, it is preferable that the number of divided states and the time of remaining in each state are appropriately designed according to the process performed by the processor system 1.

Figure 20:
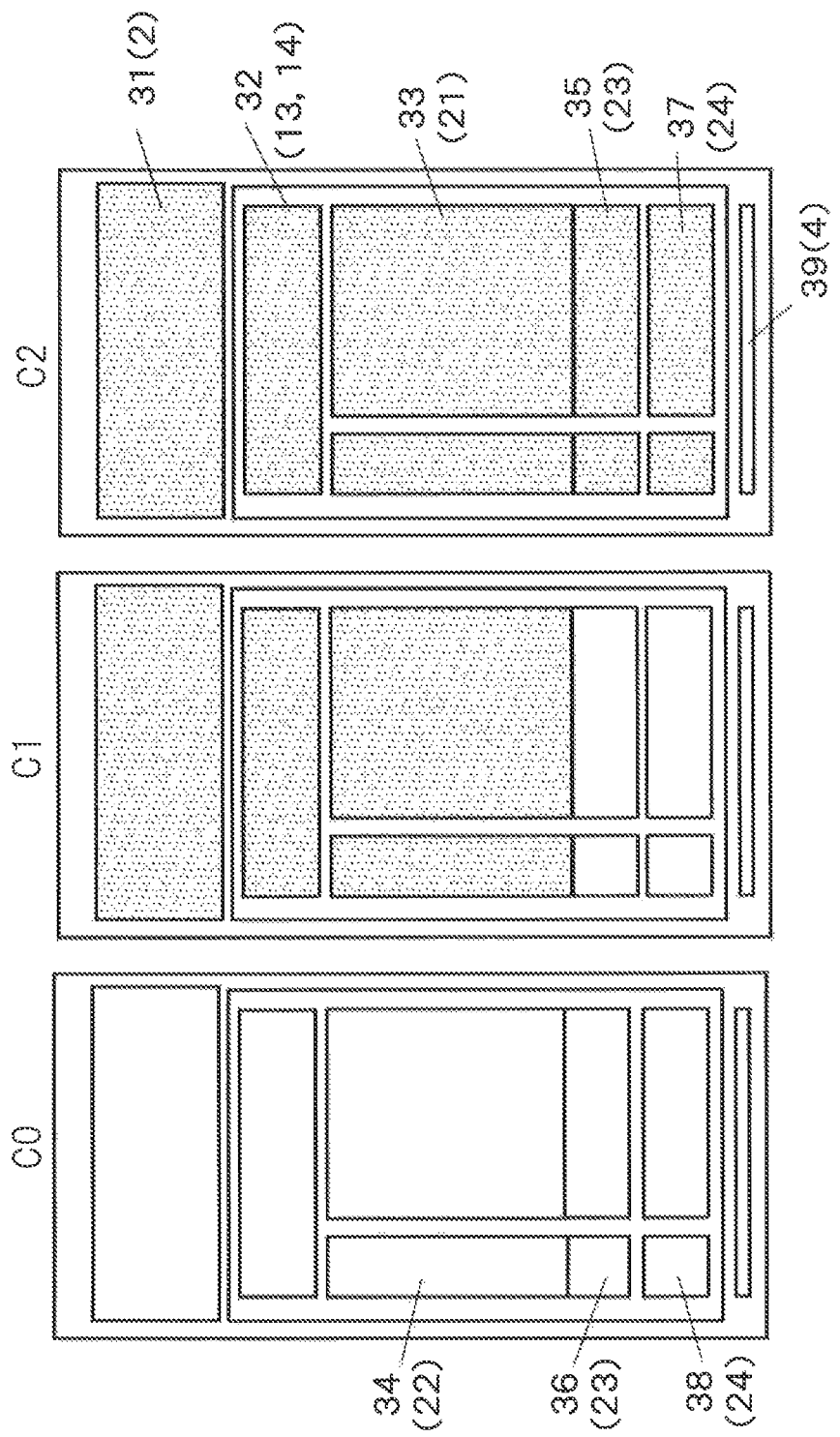
FIG. 20 is a diagram illustrating a third example of the C state.

FIG. 20 is a diagram illustrating a third example of the C state. The C0 state and the C2 state of FIG. 20 are the same as those of FIG. 18. However, the C1 states are different. In the C1 state of FIG. 20, in addition to the power-supply disconnected range in the C1 state of FIG. 18, the power supply to the processor core 2 is also disconnected. It is preferable that it is determined by considering returning overhead of the processor core 2 and the cache memory 3 whether or not the timing of disconnecting the power supply to the processor core 2 is accelerated. Namely, it is preferable that the power supply to a circuit block of which overhead for returning is small is disconnected in priority to other blocks. For example, in the case where the returning overhead of the cache memory 3 is smaller than the returning overhead of the processor core 2, as illustrated in FIG. 18 or FIG. 19, the power supply to the processor core 2 may be disconnected after the C2 state. On the contrary, in the case where the returning overhead of the processor core 2 is smaller than the returning overhead of the cache memory 3, as illustrated in FIG. 20, the power supply to the processor core 2 may be disconnected in the C1 state.

Figure 21:
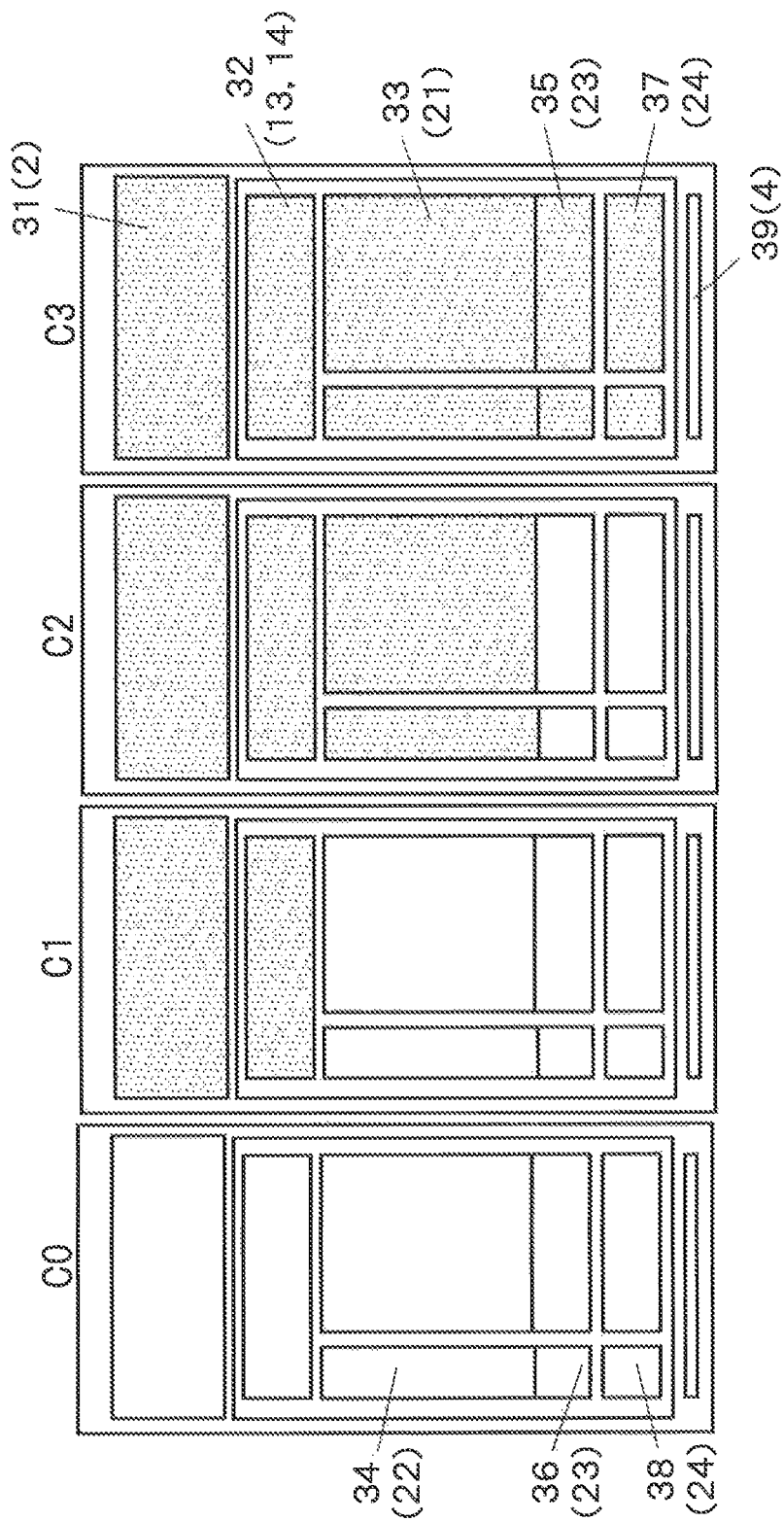
FIG. 21 is a diagram illustrating a fourth example of the C state.

FIG. 21 is diagram illustrating a fourth example of the C state. In FIG. 21, the number of times of state transition is larger than that of FIG. 20, the C1 and C2 states of FIG. 19 are shifted to the C2 and C3 states, and a new C1 state is added. In the C1 state of FIG. 21, the power supply to the first block 31 corresponding to the processor core 2 and the second block 32 corresponding to the cache control unit 13 and the error correction controller 14 is disconnected. Therefore, in FIG. 21, the returning from the C1 state to the C0 state and the returning from the C2 state to the C1 state can be performed speedily. However, since the power-voltage supplied area in the C1 state of FIG. 21 is larger than the power-voltage supplied area in the C1 state of FIG. 20, there is a problem in that the power consumption is increased. Therefore, it is preferable that the time of remaining in the C1 state of FIG. 21 is designed to be as short as possible.

In this manner, in the first embodiment, since the redundancy code of each data stored in the cache data unit 21 and the tag unit 22 in the cache memory 3 is stored in one of the nonvolatile memory unit 11 and the volatile memory unit 12 according to the state of the operation of the processor core 2, it is possible to speedily write the redundancy code, and there is no problem in that the redundancy code is lost in the power disconnection period or immediately after power restoration. More specifically, when the processor core 2 performs the normal operation, since the redundancy code is written in the volatile memory unit 12, the writing of the redundancy code can be performed at a high speed. In addition, in the power disconnection period, since the redundancy code is copied from the volatile memory unit 12 to the nonvolatile memory unit 11, although the power supply is disconnected, there is no problem in that the redundancy code is lost. Furthermore, since the redundancy code is copied from the nonvolatile memory unit 11 to the volatile memory unit 12 immediately after power restoration, a previously generated redundancy code can be effectively used, and thus it is possible to shorten the time interval from the power restoration to the time when the processor core 2 restarts the normal operation.

Second Embodiment

In a second embodiment described hereinafter, a write buffer is provided inside the error correction controller 14.

The second embodiment is the same as the first embodiment except that a portion of the internal configuration of the error correction controller 14 in the cache memory 3 is different from that of FIG. 14. Therefore, hereinafter, the difference will be mainly described.

Figure 22:
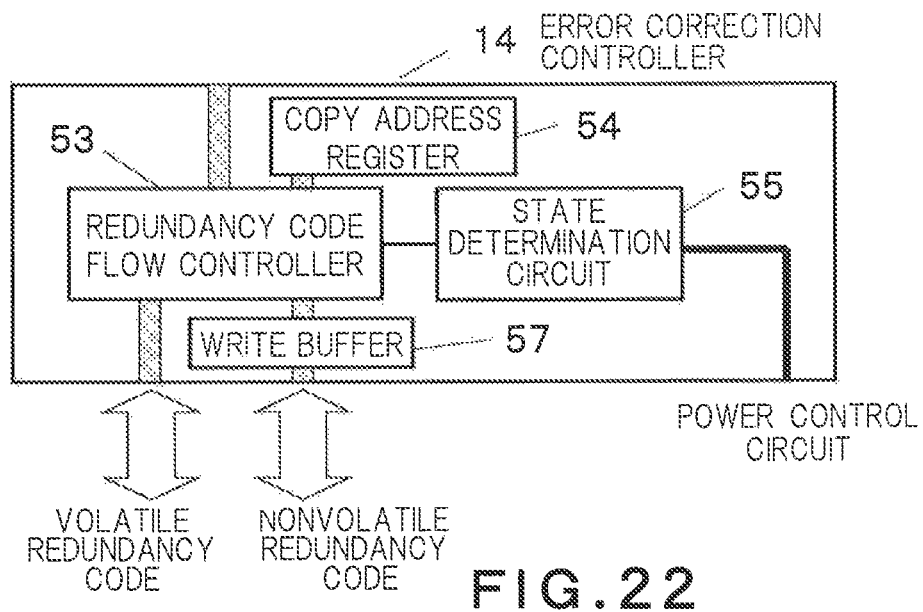
FIG. 22 is a block diagram illustrating an internal configuration of an error correction controller 14 according to a second embodiment.

FIG. 22 is a block diagram illustrating the internal configuration of the error correction controller 14 according to the second embodiment. The error correction controller 14 of FIG. 22 includes a write buffer (first storage unit) 57 in addition to the configuration of FIG. 14. The write buffer 57 is provided between the redundancy code flow controller 53 and the nonvolatile redundancy code storage unit 23.

When writing the data redundancy code and the tag redundancy code in the volatile memory unit 12, the error correction controller 14 writes the data redundancy code and the tag redundancy code in the write buffer 57. Namely, the error correction controller 14 writes the redundancy codes in the volatile memory unit 12 and the write buffer 57 in a parallel manner. The redundancy code written in the write buffer 57 is written in the nonvolatile memory unit 11 at the subsequent timing (for example, in the power disconnection period). Namely, the nonvolatile memory unit 11 stores the redundancy codes sequentially when the write buffer 57 does not perform the write operation. Therefore, in the power disconnection period, the copying of the redundancy codes from the volatile redundancy code storage unit 24 of the volatile memory unit 12 to the nonvolatile redundancy code storage unit 23 of the nonvolatile memory unit 11 may not be performed.

In addition, the reason why the writing of the redundancy code in the write buffer 57 is performed instead of directly writing the redundancy code in the nonvolatile memory unit 11 is that the time taken for data write in the nonvolatile memory unit 11 is longer than the time in the volatile memory unit 12. By configuring the write buffer 57 with a circuit such as a register circuit capable of performing high-speed writing, it is possible to speedily write the redundancy code. Namely, the redundancy code written in the write buffer 57 can be copied to the nonvolatile redundancy code storage unit at a predetermined timing.

Figure 23:
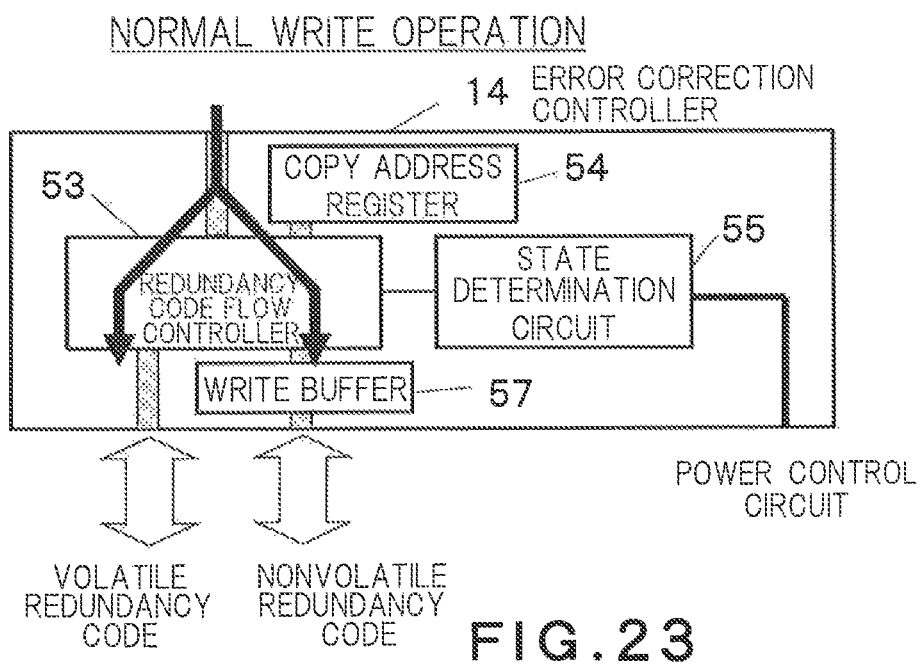
FIG. 23 is a diagram illustrating operations of a redundancy code flow controller 53 according to the second embodiment in a normal write operation period of the processor core 2.

FIG. 23 is a diagram illustrating operations of the redundancy code flow controller 53 according to the second embodiment in the normal write operation period of the processor core 2. In FIG. 23, the data redundancy code and the tag redundancy code generated by the error correction circuit 52 are stored in the volatile redundancy code storage unit 24 of the volatile memory unit 12 and in the write buffer 57 through the redundancy code flow controller 53 in a parallel manner. FIG. 23 is different from FIG. 10 in that the redundancy codes are also stored in the write buffer 57.

Figure 24:
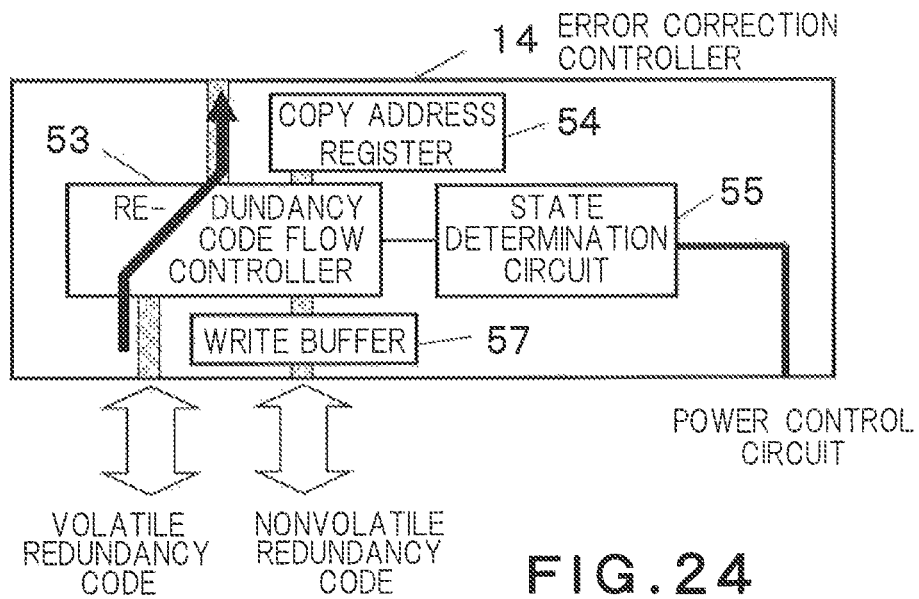
FIG. 24 is a diagram illustrating operations of the redundancy code flow controller 53 according to the second embodiment in a normal read operation period of the processor core 2.

FIG. 24 is a diagram illustrating operations of the redundancy code flow controller 53 according to the second embodiment in the normal read operation period of the processor core 2. In FIG. 24, similarly to FIG. 11, the data redundancy code and the tag redundancy code read from the volatile redundancy code storage unit 24 are transmitted through the redundancy code flow controller 53 to the processor core 2.

Figure 25:
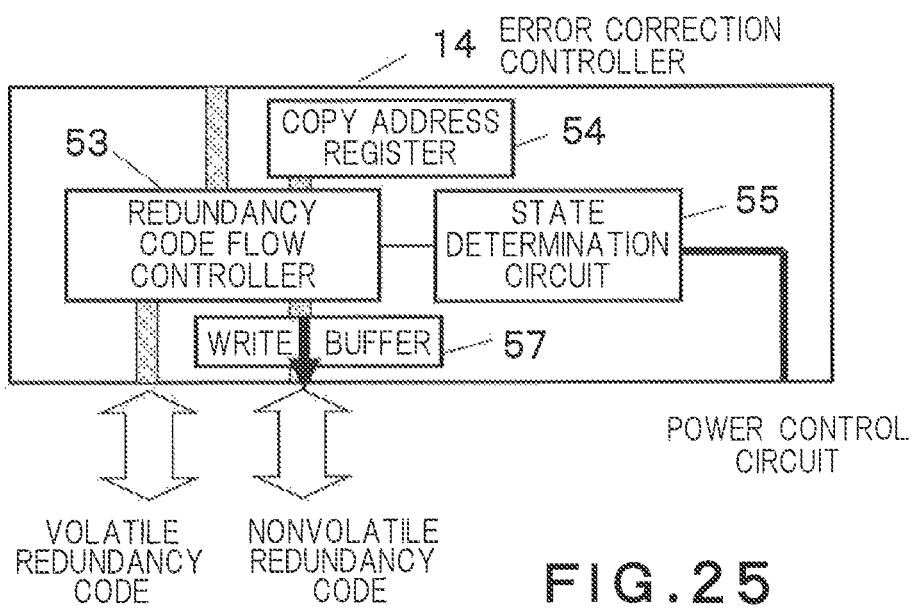
FIG. 25 is a diagram illustrating operations of the redundancy code flow controller 53 according to the second embodiment in a power disconnection period.

FIG. 25 is a diagram illustrating operations of the redundancy code flow controller 53 according to the second embodiment in the power disconnection period. In FIG. 25, among the redundancy codes written in the write buffer 57, the redundancy codes which have not yet been stored in the nonvolatile redundancy code storage unit 23 of the nonvolatile memory unit 11 are copied to the nonvolatile redundancy code storage unit 23. In the case where all the redundancy codes in the write buffer 57 are copied to the nonvolatile redundancy code storage unit 23, the power supply to the circuit blocks except for the monitoring circuit 27 in the processor system 1 is disconnected.

Figure 26:
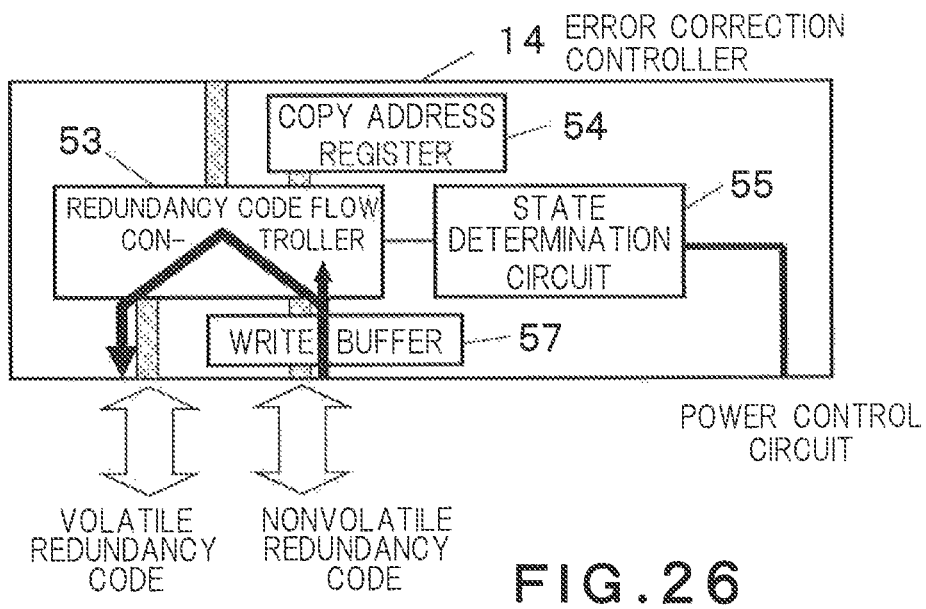
FIG. 26 is a diagram illustrating operations of the redundancy code flow controller 53 according to the second embodiment immediately after power restoration.
Figure 27:
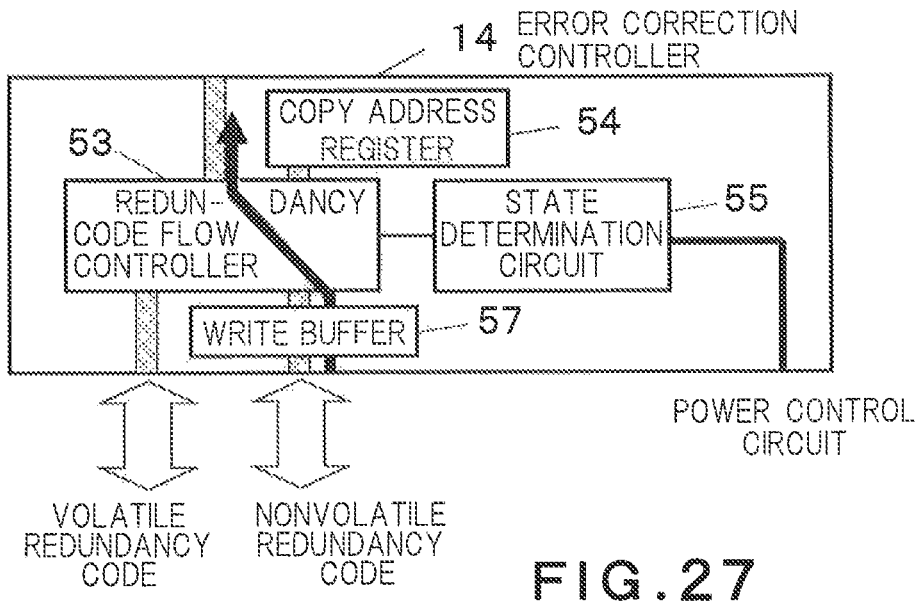
FIG. 27 is a diagram illustrating operations of the redundancy code flow controller 53 in the case where there is a read request from the processor core 2 immediately after power restoration.

FIG. 26 is a diagram illustrating operations of the redundancy code flow controller 53 according to the second embodiment immediately after power restoration. In FIG. 26, similarly to FIG. 13, the data redundancy code and the tag redundancy code stored in the nonvolatile redundancy code storage unit 23 of the nonvolatile memory unit 11 are copied to the volatile redundancy code storage unit 24 of the volatile memory unit 12. In addition, in consideration of the case where there is a read request or a write request from the processor core 2 while the copying is being performed, the addresses corresponding to the data redundancy code and the tag redundancy code stored in the nonvolatile redundancy code storage unit 23 are stored in the copy address register 54. In addition, in the case where there is a read request from the processor core 2 immediately after power restoration, as illustrated in FIG. 27, the data redundancy code and the tag redundancy code stored in the nonvolatile redundancy code storage unit 23 are transmitted through the redundancy code flow controller 53 to the processor core 2.

Figure 28:
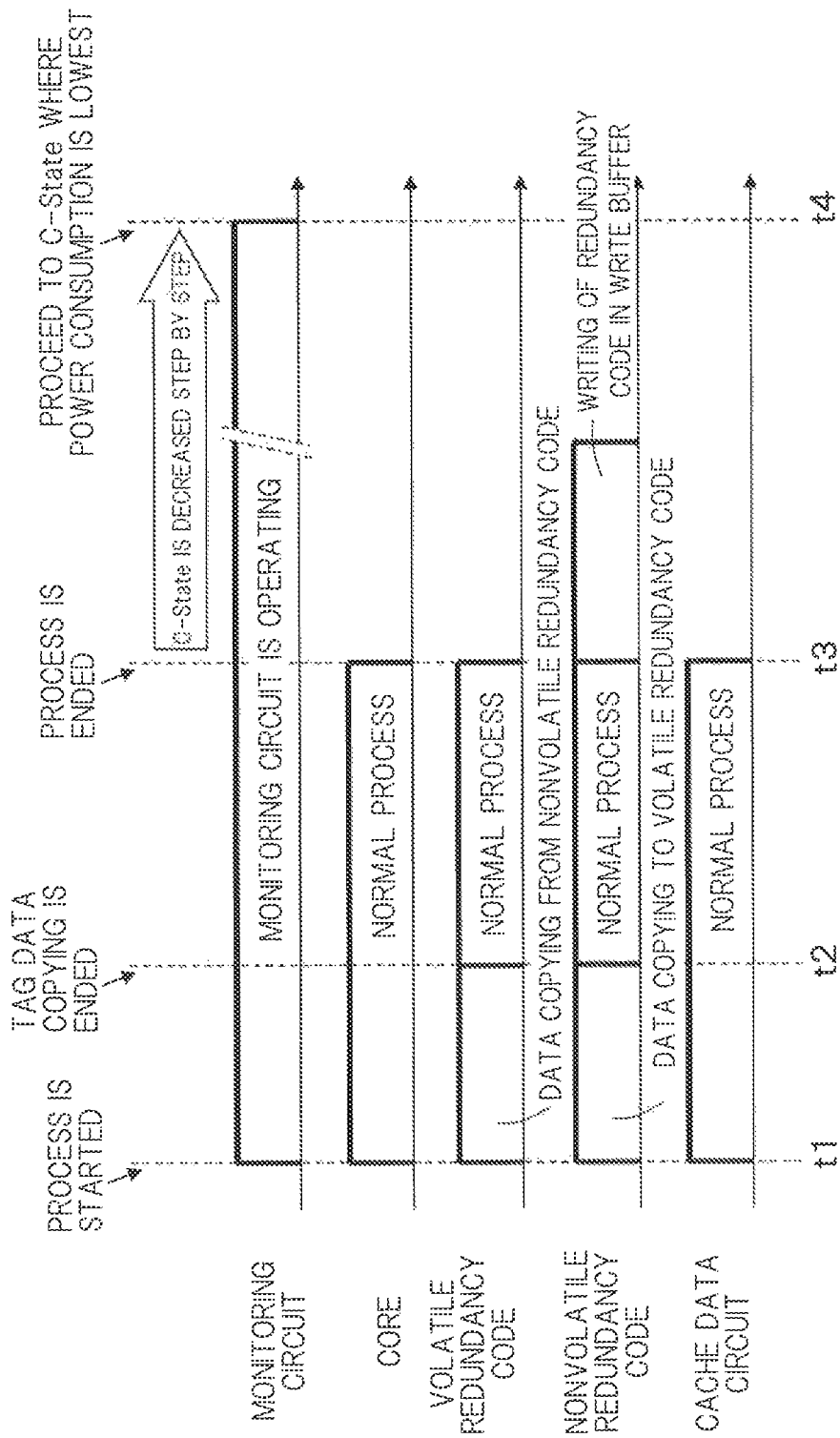
FIG. 28 is a timing diagram of a monitoring circuit 27 according to the second embodiment.

FIG. 28 is a timing diagram of the monitoring circuit 27 according to the second embodiment. Similarly to FIG. 17, FIG. 28 illustrates timing from the time immediately after power restoration to the time when the processor core 2 stops the operation. In FIG. 28, the operations of the monitoring circuit 27 from the power restoration time t1 to the operation stop time t3 of the processor core 2 are the same as those of FIG. 17.

If the processor core 2 stops the operation at the time t3, the process of copying the redundancy code stored in the write buffer 57 to the nonvolatile redundancy code storage unit 23 is performed. After the process of storing the redundancy code from the write buffer 57 to the nonvolatile redundancy code storage unit 23 is ended, the monitoring circuit 27 disconnects the power supply to the write buffer 57 and the nonvolatile memory unit 11.

In this manner, in the second embodiment, since the write buffer 57 is provided inside the error correction controller 14, the redundancy codes need not to be copied from the volatile redundancy code storage unit 24 to the nonvolatile redundancy code storage unit 23 in the power disconnection period, so that it is possible to disconnect the power supply to the volatile redundancy code storage unit 24 at a speedier timing.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:
1. A cache memory comprising:
cache memory circuitry comprising a nonvolatile memory cell to store a data;
error correction circuitry to generate a redundancy code of the data stored in the nonvolatile memory cell;
a first redundancy code storage comprising a nonvolatile memory cell capable of storing the redundancy code generated by the error correction circuitry;
a second redundancy code storage comprising a volatile memory cell capable of storing the redundancy code from the first redundancy code storage; and a copy address storage to store an address corresponding to data copied from the first redundancy code storage to the second redundancy code storage when the processor core restarts operation, wherein the error correction circuitry comprises:
state determination circuitry to determine a state of whether a processor core is operating or stopped based on the address stored in the copy address storage; and
a redundancy code flow controller to control reading and writing of the redundancy code in the first redundancy code storage and the second redundancy code storage based on the state determined by the state determination circuitry, wherein the second redundancy code storage is used for storing and reading the redundancy code during an operation of the processor core, and wherein the redundancy code flow controller controls copying of the redundancy code from the second redundancy code storage into the first redundancy code storage when the processor core stops the operation, and then controls copying of the redundancy code from the first redundancy code storage into the second redundancy code storage when the processor core restarts the operation.

2. The cache memory according to claim 1,
wherein the cache memory circuitry stores tag information for access to the data, and
wherein the first redundancy code storage and the second redundancy code storage are capable of storing a redundancy code of the data stored in the cache memory circuitry and a redundancy code of the tag information corresponding to the data stored in the cache memory circuitry.

3. The cache memory according to claim 1, wherein the second redundancy code storage stores information as to whether or not the redundancy code stored in the first redundancy code storage is stored into the second redundancy code storage when the processor core restarts the operation.

4. The cache memory according to claim 1, further comprising a first storage which stores the redundancy code generated by the error correction circuitry before the redundancy code is stored in the first redundancy code storage,
wherein the first redundancy code storage stores the redundancy code when the first storage does not perform a write operation, and
wherein the first redundancy code storage stores the redundancy code which is present in the first storage and is not yet stored in the first redundancy code storage when the processor core stops the operation.

5. The cache memory according to claim 1, wherein the nonvolatile memory cell of the cache memory circuitry is a magnetoresistive RAM (MRAM) cell.

6. A processor system comprising:
a processor core; and
a cache memory,
wherein the cache memory comprises:
cache memory circuitry comprising a nonvolatile memory cell storing a data;
error correction circuitry to generate a redundancy code of the data in the cache memory circuitry;
a first redundancy code storage comprising a nonvolatile memory cell capable of storing the redundancy code generated by the error correction circuitry;
a second redundancy code storage comprising a volatile memory cell capable of storing the redundancy code from the first redundancy code storage;
a copy address storage to store an address corresponding to data copied from the first redundancy code storage to the second redundancy code storage when the processor core restarts operation, wherein the error correction circuitry comprises:
state determination circuitry to determine a state of whether the processor core is operating or stopped based on the address stored in the copy address storage; and
a redundancy code flow controller to control reading and writing of the redundancy code in the first redundancy code storage and the second redundancy code storage based on the state determined by the state determination circuitry, wherein the second redundancy code storage is used for storing and reading the redundancy code during an operation of the processor core, and wherein the redundancy code flow controller stores controls copying of the redundancy code from the second redundancy code storage into the first redundancy code storage when the processor core stops the operation, and then controls copying of the redundancy code from the first redundancy code storage into the second redundancy code storage when the processor core restarts the operation.

7. The processor system according to claim 6,
wherein the cache memory circuitry stores tag information necessary for access to the data in addition to the data, and
wherein the first redundancy code storage and the second redundancy code storage are capable of storing a redundancy code of the data stored in the cache memory circuitry and a redundancy code of the tag information corresponding to the data stored in the cache memory circuitry.

8. The processor system according to claim 7, further comprising a first storage which stores the redundancy code generated by the error correction circuitry before the redundancy code is stored in the first redundancy code storage,
wherein the first redundancy code storage stores the redundancy code when the first storage does not perform a write operation, and
wherein the redundancy code flow controller performs control of storing the redundancy code which is present in the first storage and is not yet stored in first redundancy code storage when the processor core stops the operation.

9. The processor system according to claim 6, further comprising:
a first semiconductor chip on which the cache memory circuitry and the first redundancy code storage are provided; and
a second semiconductor chip on which the processor core and the second redundancy code storage are provided, the second semiconductor chip being stacked with the first semiconductor chip.

10. The processor system according to claim 6, wherein the nonvolatile memory cell of the cache memory circuitry is a magnetoresistive RAM (MRAM) cell.

* * * * *